(12) United States Patent
Tonar et al.

(10) Patent No.: US 7,679,809 B2
(45) Date of Patent: *Mar. 16, 2010

(54) VARIABLE REFLECTANCE MIRRORS AND WINDOWS

(75) Inventors: William L. Tonar, Holland, MI (US); Fredrick T. Bauer, Holland, MI (US); Alan R. Watson, Buchanan, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/191,804

(22) Filed: Aug. 14, 2008

(65) Prior Publication Data

US 2009/0002822 A1 Jan. 1, 2009

Related U.S. Application Data

(63) Continuation of application No. 11/179,793, filed on Jul. 12, 2005, now Pat. No. 7,502,156.

(60) Provisional application No. 60/587,113, filed on Jul. 12, 2004.

(51) Int. Cl.
*G02F 1/15* (2006.01)
*G02F 1/153* (2006.01)

(52) U.S. Cl. .................. 359/267; 359/265; 359/604

(58) Field of Classification Search .............. 359/267, 359/265, 604
See application file for complete search history.

(56) References Cited

U.S. PATENT DOCUMENTS

| 5,056,899 A | 10/1991 | Warszawski |
| 5,568,316 A | 10/1996 | Schrenk et al. |
| 5,668,663 A | 9/1997 | Varaprasad et al. |
| 5,724,187 A | 3/1998 | Varaprasad et al. |
| 5,762,823 A | 6/1998 | Hikmet |
| 5,798,057 A | 8/1998 | Hikmet |
| 6,045,643 A | 4/2000 | Byker et al. |
| 6,064,508 A | 5/2000 | Forgette et al. |

(Continued)

FOREIGN PATENT DOCUMENTS

WO WO 98/38547 9/1998

(Continued)

OTHER PUBLICATIONS

Matsui et al., "Gaussian-Beam Open Resonator with Highly Reflective Circular Coupling Regions," IEEE Transactions on Microwave Theory and Techniques, v. 41, No. 10, Oct. 1992, pp. 1710-1714.

(Continued)

*Primary Examiner*—Joshua L Pritchett
(74) *Attorney, Agent, or Firm*—Quarles & Brady LLP

(57) ABSTRACT

Various structures for variable reflectance rearview mirrors and variable transmittance windows are disclosed. One embodiment pertains to the provision of a polarized reflector in a rearview mirror. Another embodiment pertains to the provision of a switchable cholesteric liquid crystal element in a window. Yet another embodiment pertains to the provision of a plurality of apertures in a reflector layer of a rearview mirror where the apertures are sized and positioned in alignment with light emitting areas of a display positioned behind the reflector layer. In another embodiment, a moveable display or mirror element is attached to a rearview mirror housing.

56 Claims, 22 Drawing Sheets

U.S. PATENT DOCUMENTS

| | | | |
|---|---|---|---|
| 6,111,684 A | 8/2000 | Forgette et al. | |
| 6,111,685 A | 8/2000 | Tench et al. | |
| 6,166,847 A | 12/2000 | Tench et al. | |
| 6,166,848 A | 12/2000 | Cammenga et al. | |
| 6,170,956 B1 | 1/2001 | Rumsey et al. | |
| 6,188,505 B1 | 2/2001 | Lomprey et al. | |
| 6,210,012 B1 * | 4/2001 | Broer | 362/84 |
| 6,239,898 B1 | 5/2001 | Byker et al. | |
| 6,310,714 B1 | 10/2001 | Lomprey et al. | |
| 6,346,698 B1 | 2/2002 | Turnbull | |
| 6,356,376 B1 | 3/2002 | Tonar et al. | |
| 6,407,847 B1 | 6/2002 | Poll et al. | |
| 6,433,914 B1 | 8/2002 | Lomprey et al. | |
| 6,512,624 B2 | 1/2003 | Tonar et al. | |
| 6,567,708 B1 | 5/2003 | Bechtel et al. | |
| 6,572,233 B1 | 6/2003 | Northman et al. | |
| 6,594,065 B2 | 7/2003 | Byker et al. | |
| 6,594,067 B2 | 7/2003 | Poll et al. | |
| 6,597,489 B1 | 7/2003 | Guarr et al. | |
| 6,661,830 B1 | 12/2003 | Reed et al. | |
| 6,671,080 B2 | 12/2003 | Poll et al. | |
| 6,672,745 B1 | 1/2004 | Bauer et al. | |
| 6,700,692 B2 | 3/2004 | Tonar et al. | |
| 6,800,871 B2 | 10/2004 | Matsuda et al. | |
| 6,842,276 B2 | 1/2005 | Poll et al. | |
| 6,870,655 B1 | 3/2005 | Northman et al. | |
| 7,362,505 B2 | 4/2008 | Hikmet et al. | |
| 7,379,243 B2 | 5/2008 | Horsten et al. | |
| 7,495,719 B2 * | 2/2009 | Adachi et al. | 349/96 |
| 7,502,156 B2 * | 3/2009 | Tonar et al. | 359/267 |
| 2003/0103141 A1 | 6/2003 | Bechtel et al. | |
| 2003/0210369 A1 * | 11/2003 | Wu | 349/114 |
| 2004/0105614 A1 | 6/2004 | Kobayashi et al. | |
| 2004/0251804 A1 | 12/2004 | McCullough et al. | |
| 2005/0024591 A1 | 2/2005 | Lian et al. | |
| 2005/0078347 A1 | 4/2005 | Lin et al. | |
| 2005/0111070 A1 | 5/2005 | Lin et al. | |
| 2005/0185278 A1 | 8/2005 | Horsten et al. | |
| 2005/0259326 A1 | 11/2005 | Weber et al. | |
| 2006/0164725 A1 | 7/2006 | Horsten et al. | |
| 2007/0041096 A1 | 2/2007 | Nieuwkerk et al. | |
| 2008/0308219 A1 | 12/2008 | Lynam | |
| 2009/0015736 A1 | 1/2009 | Weller | |
| 2009/0033837 A1 | 2/2009 | Molsen et al. | |
| 2009/0040465 A1 | 2/2009 | Conner et al. | |
| 2009/0040588 A1 | 2/2009 | Tonar et al. | |
| 2009/0040778 A1 | 2/2009 | Takayanagi et al. | |

FOREIGN PATENT DOCUMENTS

| | | |
|---|---|---|
| WO | WO 03/021343 | 3/2003 |
| WO | WO 2004/079318 | 9/2003 |
| WO | WO 2004/100534 | 11/2004 |
| WO | WO 2005/024500 | 3/2005 |
| WO | WO 2005/050267 | 6/2005 |
| WO | WO 2005/071645 | 8/2005 |
| WO | WO 2007/053710 | 5/2007 |

OTHER PUBLICATIONS

John. Roberts, Dichroic Mirrors with Semi-Active Covert Displays—New Tools for Vehicle Safety, Muth Advanced Technologies, international. Body Engineering Conference (Warren, MI), p. 7, Sep. 21, 1993.

International Searching Authority, Authorized Officer Blaine R. Copenheaver, International Search Report and Written Opinion in International Application No. PCT US2009/049458, mailed Sep. 9, 2009; 9 pages.

* cited by examiner

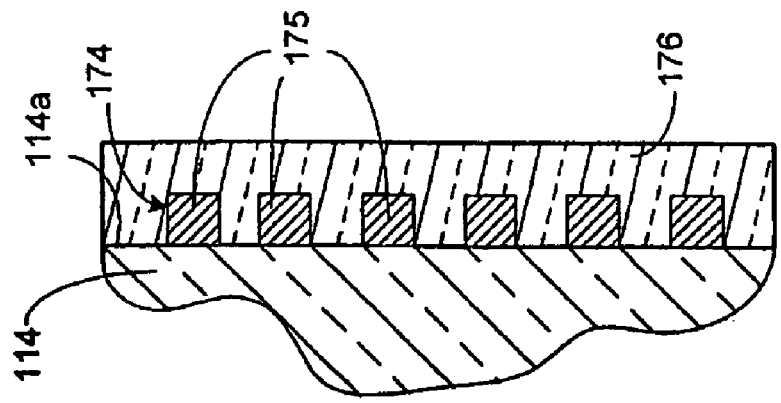
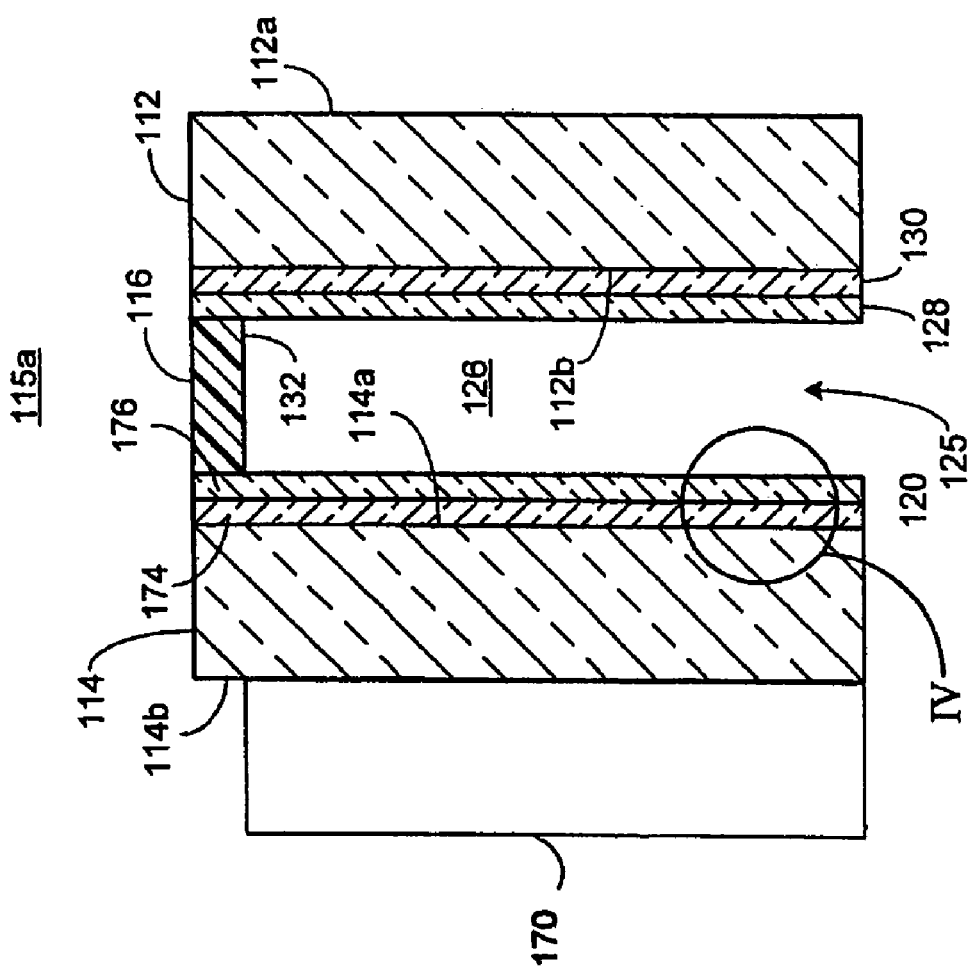
FIG. 4
FIG. 3A

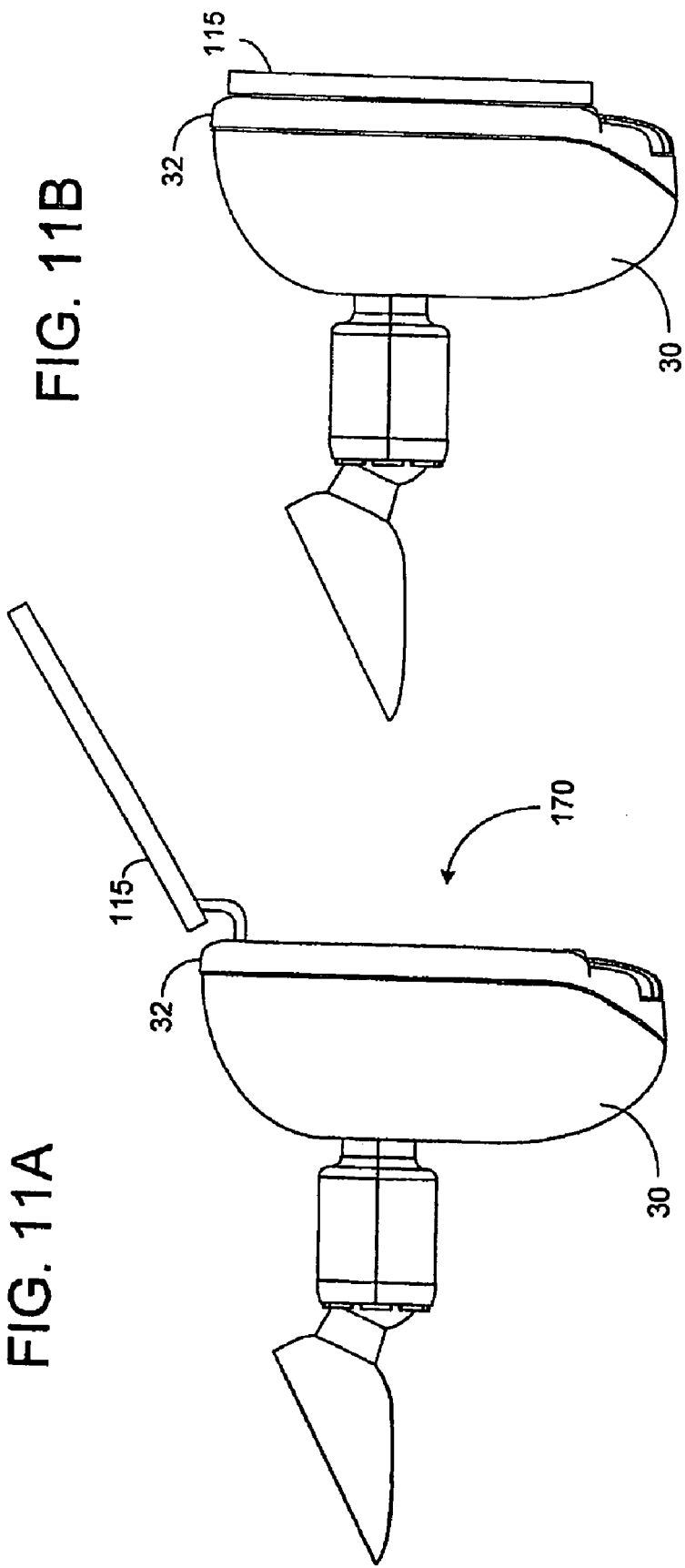

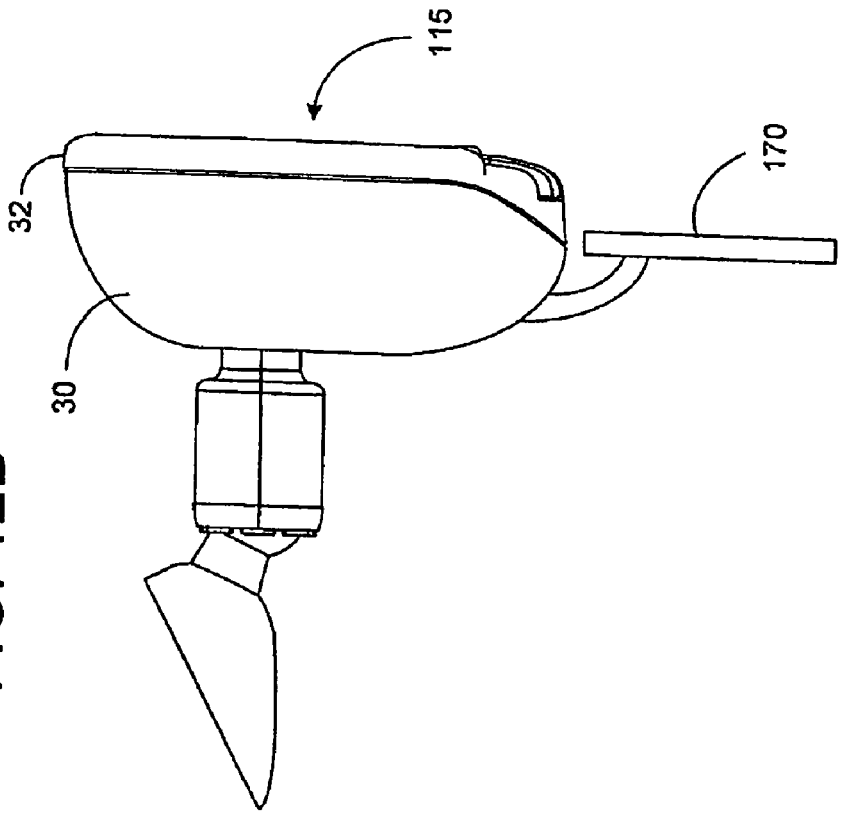
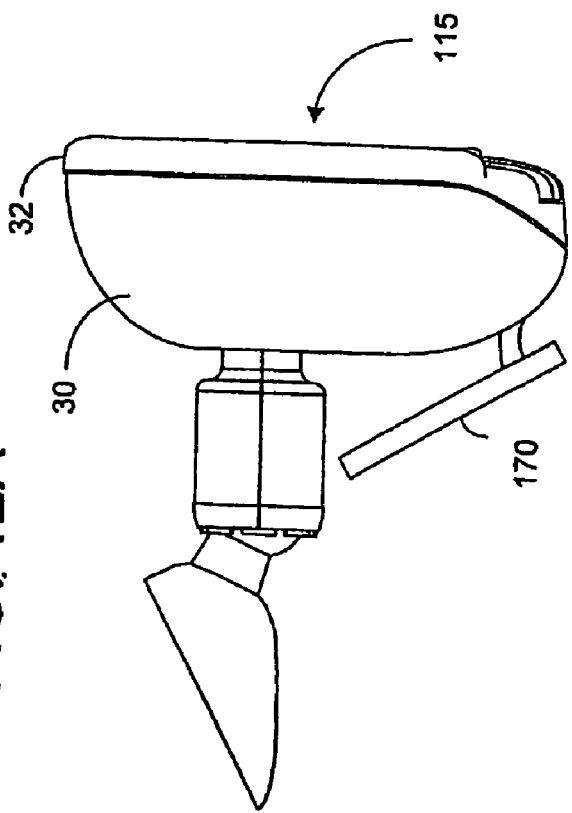
FIG. 12B
FIG. 12A

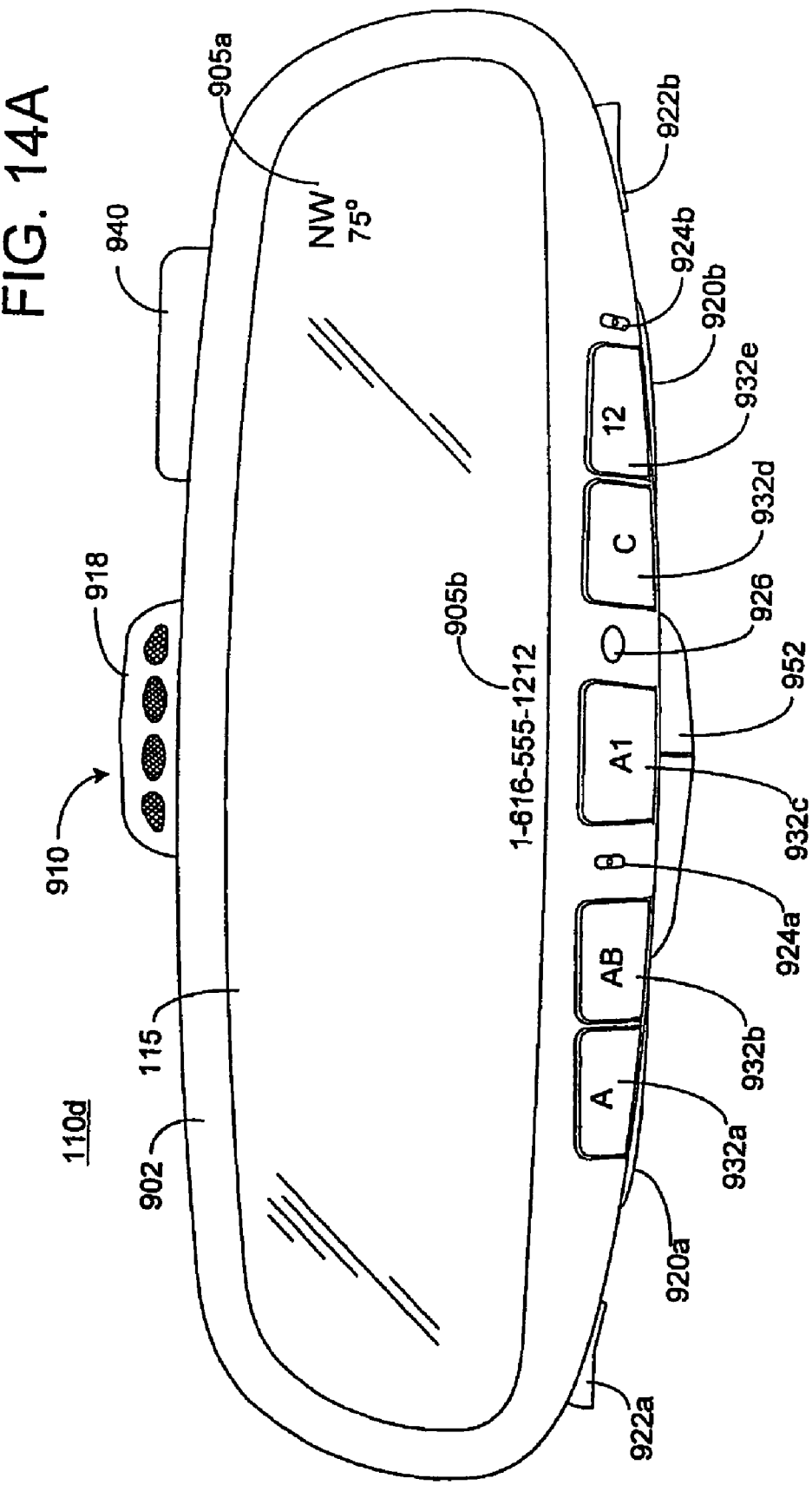

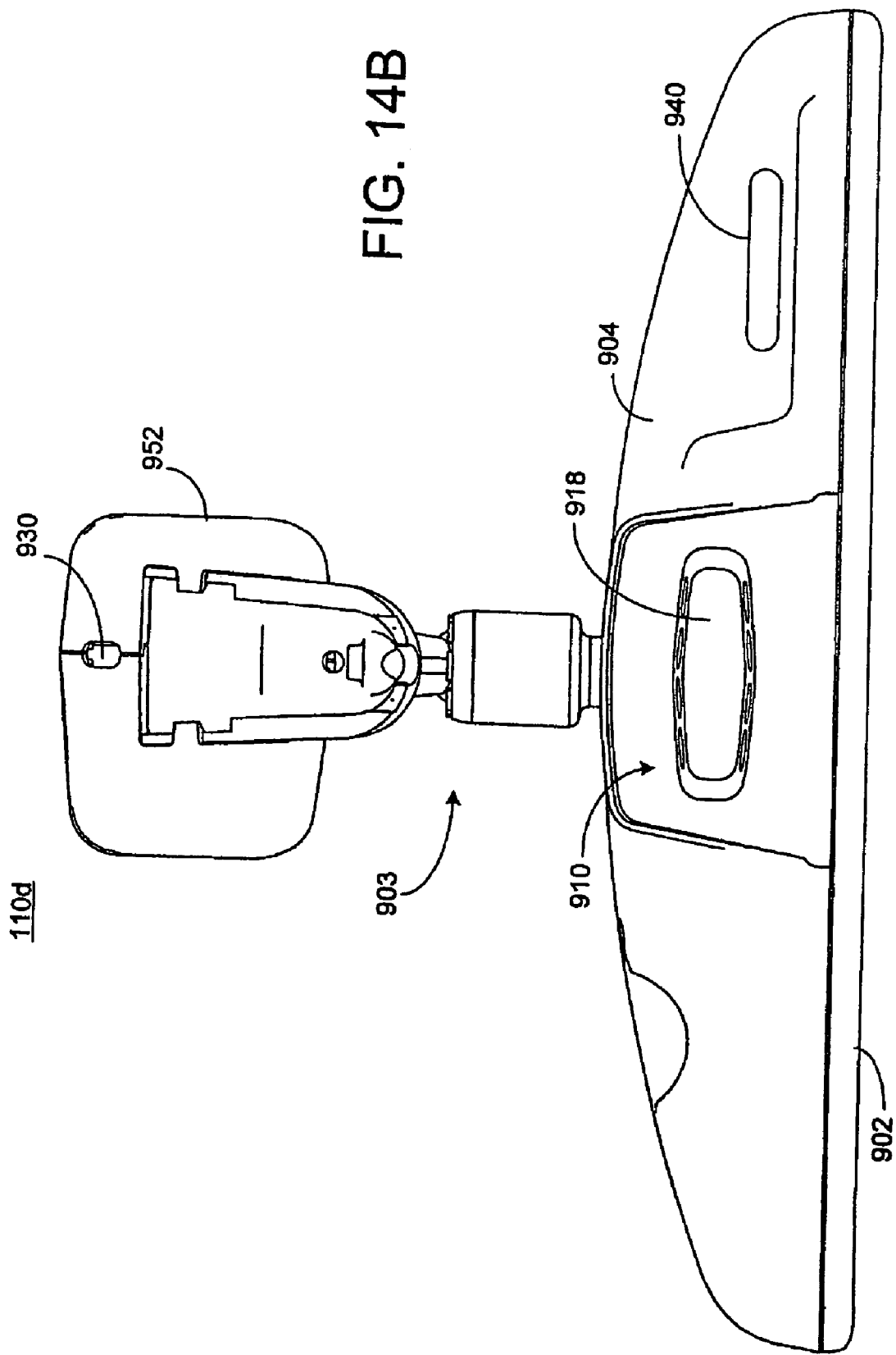

US 7,679,809 B2

VARIABLE REFLECTANCE MIRRORS AND WINDOWS

CROSS-REFERENCE TO RELATED APPLICATION

This application is a continuation of U.S. patent application Ser. No. 11/179,793 filed on Jul. 12, 2005, and, like that application, claims priority to U.S. Provisional Application No. 60/587,113 filed on Jul. 12, 2004, each of the foregoing applications being incorporated herein by reference in its entirety.

BACKGROUND OF THE INVENTION

The present invention generally pertains to a rearview mirror assembly for a vehicle and to windows (both architectural and vehicular). More particularly, the present invention pertains to a rearview mirror assembly incorporating an electronic device such as a display, light source, and/or light sensor, and to windows having a variable transmittance.

It is desirable to provide electronic devices such as displays, sensors, signal lights, and indicator lights in a rearview mirror assembly of a vehicle. There are several issues with designing a rearview mirror assembly incorporating such an electronic device, particularly when the rearview mirror assembly is an inside mirror assembly. If the electronic device is disposed adjacent the mirror element, it causes the inside rearview mirror assembly to have a larger area, which disadvantageously blocks more of the driver's view through the windshield. To address this problem, electronic devices are provided behind the mirror element so as to transmit or receive light through the mirror element. To allow for light to be transmitted through the mirror element, a portion of the reflective layer of the mirror element is removed to define a window in front of the electronic device. This solution, however, reduces the reflective viewing area of the mirror assembly. Such a window also provides further problems when the reflective layer serves as an electrode for an electro-optic mirror element, such as an electrochromic mirror element. Thus, the window acts to eliminate the electrode across a portion of the electrochromic mirror element thereby causing an objectionable non-uniform coloration of the mirror element when dimmed.

Commonly-assigned U.S. Pat. No. 6,700,692 discloses several solutions for incorporating electronic devices behind an electro-optic mirror element. In particular, this patent discloses the use of a "transflective" layer, which is partially reflective, partially transmissive. Although such a transflective layer is very effective for most forms of electronic devices, the transflective layer tends to block a large percentage of light (passing about 10% of incident light). As a result, the light from a display or light source behind the mirror element is not efficiently transmitted through the transflective layer. This becomes more problematic when a display is provided that displays images of variable brightness during periods of bright daylight. This is because the reflectivity of the transflective layer is still rather high, and therefore, there is large light loss going through transflective layer producing poorer contrast. The above '692 patent further discloses an embodiment whereby slit-like, parallel apertures are etched in the reflective layer in front of a compass display and/or in front of turn signal indicator lights. Such apertures are often relatively large and few in number.

Recently, there has been a strong interest to provide a high resolution video-type display in or around the position of an inside rearview mirror assembly. One such application is backup control/vision on large vehicles such as sport utility vehicles (SUVs) or minivans where a clear view of what is behind is blocked by the car interior, seats, headrests, or other items. Positioning a camera on or near the back of the vehicle with the image displayed on or near the rearview mirror can aid the driver in backing up safely. This image could be displayed only when the vehicle is in reverse or it could be used to supplement or replace the mirror when driving. In which case, it is desirable to have a mirror available as a back up for the camera/display system in case it fails.

Rearview mirrors have been proposed that include a video display that pulls down from the mirror body for use in back up situations. Again, this is disadvantageous in that the video display blocks the driver's view to the front of the vehicle. Further, the video display size is limited. Additionally, the driver must manually pull down the display, and the display is in a position that is vulnerable to damage by passengers or objects.

Accordingly, there exists the need for a rearview mirror assembly incorporating an electronic device where the electronic device may transmit or receive light efficiently through the mirror element.

Variable transmission windows have been proposed for architectural windows and skylights and for sunroofs and windows for vehicles, including automobiles, trucks, recreational vehicles and trailers, airplanes, trains, and boats. One form of variable transmission window that has been proposed utilizes an electrochromic element that changes from a colorless state to a colored state in response to an applied voltage. Such electrochromic elements thus vary the transmittance of the window by changing color and absorbing light that is not to be transmitted. Such electrochromic windows are disclosed in U.S. Pat. Nos. 6,239,898, 6,594,065, 6,407,847, 6,594,067, 6,671,080, 6,842,276, 6,567,708, 6,597,489, 6,045,643, and 5,805,330. Electrochromic windows function suitably for most applications. However, electrochromic windows do not respond instantaneously to an applied voltage and absorb and thus radiate heat.

Accordingly, there exists the need for a variable transmission window that more quickly responds to an applied voltage and that varies transmission by blocking both visible and infrared light without absorbing light and thus generating heat inside the building.

SUMMARY OF THE INVENTION

According to one aspect of the invention, a variable reflectance mirror element is provided for use in a rearview mirror assembly having an electronic device positioned behind the mirror element for transmitting/receiving light of having a first polarization. The mirror element comprises: a first substrate; a second substrate; a first electrode provided on a surface of the first substrate; a second electrode provided on a surface of the second substrate; an electro-optic medium provided between the first and second substrates that changes transmittance in response to a voltage applied across the first and second electrodes; and a polarized reflector provided on a surface of the second substrate for transmitting light of having the first polarization and reflecting light of having a second polarization opposite the first polarization.

According to another embodiment of the present invention, a rearview mirror assembly for a vehicle comprises: an electro-optic element comprising first and second electrodes, the electro-optic element changes reflectance in response to a voltage applied across the first and second electrodes, wherein the second electrode comprises a polarized reflector for transmitting light of having a first polarization and reflecting light of having a second polarization opposite the first polarization; and an electronic device positioned behind the polarized reflector for transmitting/receiving light of having the first polarization through the polarized reflector.

According to another aspect of the present invention, an electrochromic element comprises: a first substrate; a second substrate spaced apart from the first substrate; a first electrode provided on a surface of the first substrate; a second electrode provided on a surface of the second substrate; an electrochromic medium provided between the first and second substrates; and a polarized reflector provided on a surface of one of the first and second substrates, the polarized reflector transmits light of having a first polarization and reflects light of having a second polarization opposite the first polarization.

According to another aspect of the present invention, a rearview mirror assembly is provided for a vehicle comprising: a housing adapted for attachment to the vehicle; a display positioned within the housing; and a mirror element moveably mounted to the housing, the mirror element movable between a first position in front of the display, and a second position away from the display.

According to another aspect of the present invention, a rearview mirror assembly is provided for a vehicle comprising: a housing adapted for attachment to the vehicle; a mirror element positioned within the housing; and a display moveably mounted to the housing, the display movable between a first position where the display may be viewed by a vehicle occupant, and a second position where the display may not be readily viewed by a vehicle occupant.

According to another aspect of the present invention, an electro-optic variable transmittance window comprises a switchable cholesteric element having a pitch that varies in response to an applied voltage so as to vary the transmittance of the electro-optic variable transmittance window.

According to another aspect of the present invention, a rearview mirror assembly is provided for a vehicle comprising: a substrate; a reflective layer applied to a surface of the substrate; and a display having a plurality of light emitting areas, wherein the reflective layer has a plurality of apertures formed therethrough, each aperture being associated and substantially aligned with the light emitting regions of the display.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 3A is a cross-sectional view of the rearview mirror element shown in FIG. 2 as taken along line III-III according to one embodiment of the present invention;

FIG. 4 is a close up cross-sectional of area IV shown in FIG. 3A;

FIGS. 11A and 11B are side elevational views schematically illustrating an inside rearview mirror assembly constructed in accordance with another embodiment of the present invention;

FIGS. 12A and 12B are side elevational views schematically illustrating an inside rearview mirror assembly constructed in accordance with another embodiment of the present invention;

FIG. 14A is an elevational view of the front of a rearview mirror assembly constructed according to the present invention;

FIG. 14B is a plan view of the top of a rearview mirror assembly constructed according to the present invention;

DESCRIPTION OF THE INVENTION

Figure 1:
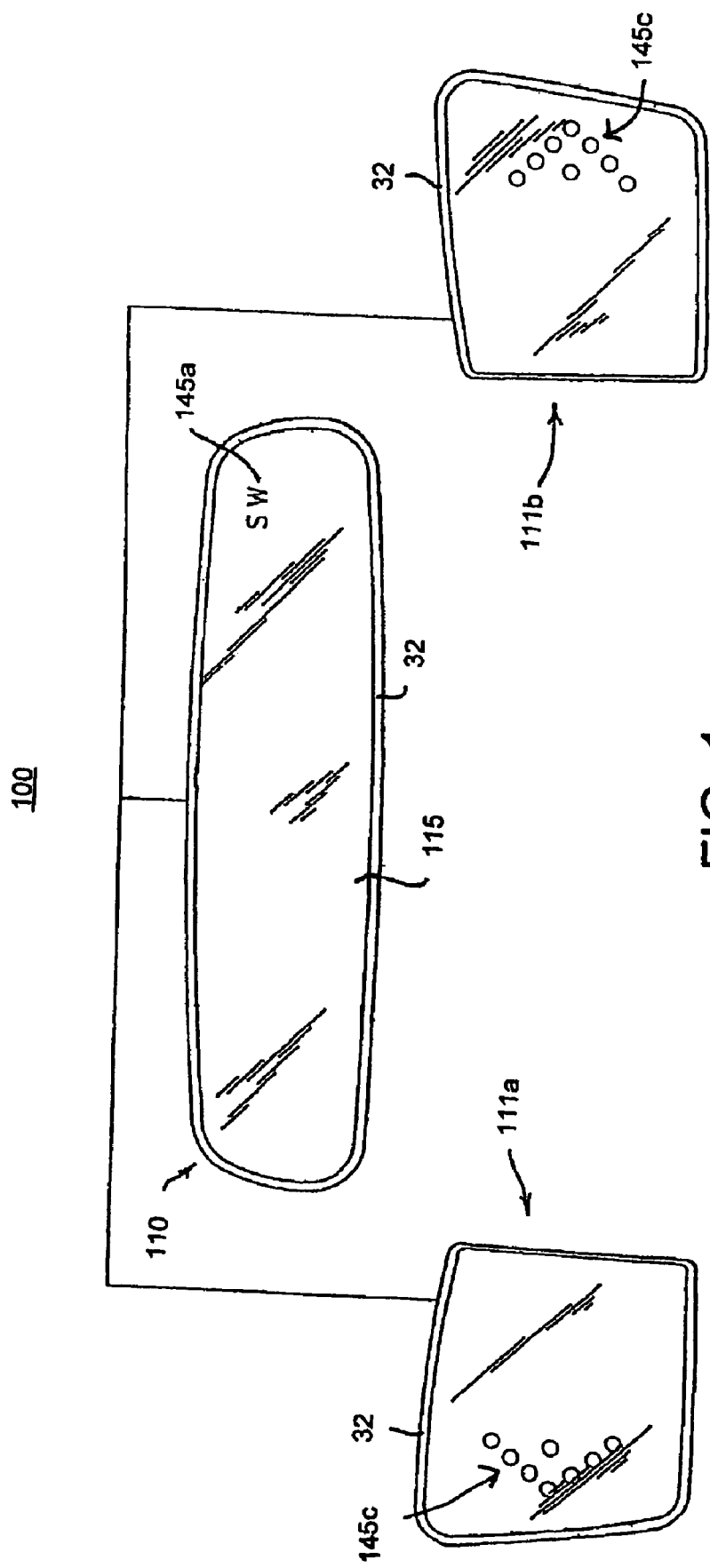
FIG. 1 is a front elevational view schematically illustrating a rearview mirror system constructed in accordance with the present invention.

The present invention pertains to various structures for variable reflectance rearview mirrors and variable transmittance windows. One embodiment pertains to the provision of a polarized reflector in a rearview mirror. Another embodiment pertains to the provision of a switchable cholesteric liquid crystal element in a window. Yet another embodiment pertains to the provision of a plurality of apertures in a reflector layer of a rearview mirror where the apertures are sized and positioned in alignment with light emitting areas of a display positioned behind the reflector layer. In another embodiment, a moveable display or mirror element is attached to a rearview mirror housing.

According to one of the above embodiments, the present invention may generally include a rearview mirror assembly comprising a variable reflectance mirror element and an electronic device positioned behind the mirror element so as to transmit or receive light through the mirror element. Unlike prior rearview variable reflectance mirror elements, however, the mirror element used in the present invention, may utilize a polarized reflector that transmits light having a first polarization, while reflecting light having a second polarization opposite the first polarization. The electronic device emits light or receives light having the first polarization such that the light passes very efficiently through the mirror element with almost no loss. Approximately half of the ambient light, on the other hand, is reflected so that the mirror element acts as an effective rearview mirror. The polarized reflector may function as one of the electrodes of the variable reflectance mirror element.

The reflective polarizer may be a "wire grid" type of polarizer that reflects (specularly) one plane of light polarization and transmits the other. A display or other light source that emits polarized light would not suffer a large drop in brightness if it is oriented such that its polarized light is transmitted through the mirror element and not reflected. If a light source or light emitting display that does not emit polarized light is used behind a "wire polarizer" mirror element, a portion of the light is transmitted and a portion of the light is reflected. Both the transmitted and reflected light is polarized. The polarized reflected light could be de-polarized by reflective scattering and part of that light will then be transmitted by the mirror element or the plane of polarization of the light could be rotated 90 degrees and reflected back through the "wire grid" polarizer. This will enhance the display brightness. Similar techniques could be used to utilize ambient light that is transmitted through the wire grid polarizer into the display/ reflector assembly.

Suitable "wire grid" polarizers that can be used for this application are available from Moxtek of Orem, Utah, and NanoOpto Corporation of Somerset, N.J. The use of "wire grid" polarizers in mirror/display devices is disclosed in WO 2005/050267 A1, WO 2005/024500 A1, and WO 03/079318 A1, the entire disclosures of which are incorporated herein by reference.

If a TFT LCD is used as a video display, and the display is oriented such that its polarized light is transmitted by the wire grid polarizer, almost 100 percent of the light it emits is transmitted and almost 50 percent of ambient light is specularly reflected by the mirror. The result is a high brightness "display on demand" mirror where almost no display brightness is lost yet the "mirror" is near 50 percent reflective to ambient light.

This "wire grid" polarizer/mirror and display assembly could be used "as is" in a non-dimming rearview mirror assembly or it could be laminated to or attached to an electro-optic dimming window (LCD or electrochromic element) to make a dimming "wire grid" polarizer/mirror and display assembly with variable reflectance. One advantage of using such an electro-optic element in front of the reflective polarizer is that the electro-optic element may be made less transmissive when the display is turned on. The ambient light striking the mirror element passes through the electro-optic element twice while the light from the display or light source only passes through once. Thus, by dimming the electro-optic element when the display is on, twice as much of the ambient light is absorbed as the light from the display or light source thereby increasing the relative contrast ratio of the display during high brightness ambient conditions.

A typical "wire grid" polarizer available from Moxtek (ProFlux™ type) is made by coating glass with a reflective aluminum layer. This aluminum layer is then patterned into straight lines and spaces using typical semiconductor patterning technology. The beginning of line to beginning of line spacing is about 0.15 microns (150 nm). The aluminum line width and spacing width can vary, but looks to be about a 60 AC/40 size ratio by SEM analysis. The ratio of the metallic line width to space width can be varied to change the ratio of reflection to transmission. Such an assembly could be used as an electrode in an electro-optic element such as an electrochromic device or an LCD device. For example, if a silver or silver alloy film is patterned in such a way, it could be used as a third surface reflector electrode in an electrochromic mirror element. The metal grid layer could be overcoated or undercoated with a transparent conductor, such as ITO, ZnO, or tin oxide to enhance conductivity or electrode stability. The wire grid layer could also be overcoated or undercoated with a thin layer of reflective material such as silver, silver/gold, gold, aluminum, or other reflective metal or metal alloy to enhance reflectivity. The reflectivity could also be enhanced by an overcoat or undercoat of a dichroic film stack or enhanced by such typical means of increasing the reflectivity of silver or aluminum films. In this way, a dimming mirror assembly can be made that will support a high brightness, high resolution display assembly.

Other methods used to reflect light of one type of polarization (circular or linear) and transmit light of the second type of polarization are known that may be used as the polarized reflector of a variable reflectivity mirror. A laminated foil made of multiple layers of plastic film wherein some or all of the films layers have an internal molecular orientation (induced by stretching or other means) that induces a directional difference in refractive index can be constructed such that the laminated foil reflects one type of polarization and transmits the second type of polarization.

Cholesteric polarizers can also be made that will reflect one type of polarization and transmit the second type of polarization, and thus serve as the polarized reflector for a variable reflectivity mirror. These polarizers can be made such that they are voltage switchable. In other words, these polarizers can be switched from reflecting the first type of polarization and transmitting the second type of polarization to transmitting both types of polarization or they can be switched from reflecting the second type of polarization and transmitting the first type of polarization to transmitting both types of polarization. The wavelength of light that is reflected by these cholesteric polarizers is dependant on the pitch of the twist in the cholesteric structure. A single pitch cholesteric structure reflects a fairly narrow (<100 nm) bandwidth of light. A variable pitch cholesteric structure reflects a wider bandwidth of light. The greater the variation in cholesteric pitch, the wider the bandwidth of light that is reflected. Such a variable pitch cholesteric structure is described in U.S. Pat. Nos. 5,762,823 and 5,798,057, the entire disclosures of which are incorporated herein by reference.

One or two of these switchable variable pitch cholesteric polarizers can be used in combination with a light emitting display device to construct a variable reflectance rearview mirror with enhanced display viewability. One switchable variable pitch cholesteric polarizer in combination with a typical TFT LCD assembly can be configured to either reflect one type of polarization and transmit the second type of polarization that the TFT LCD emits or transmit both types of polarization. This construct enables four modes of operation: 1) mirror at ~50% reflection, display off; 2) mirror at ~50% reflection, display on; 3) mirror at ~0% reflection, display on; and 4) mirror at ~0% reflection, display off (note: the reflectance of the mirror assembly in this configuration would approximately be the magnitude of reflection off of the first substrates surface or about 4%).

Two switchable variable pitch cholesteric polarizers used in combination with a typical TFT LCD add one additional high reflectance mirror mode to the above. In the high reflectance mode, the first switchable reflective polarizer would reflect one type of polarization and transmit the second and the second switchable reflective polarizer would reflect the second type of polarization. In the mid reflectance mode, one reflective polarizer would reflect one type of polarization and transmit the second type of polarization which is the same polarization of light the TFT LCD emits. In the low reflectance mode, both switchable reflective polarizers would transmit both types of polarization. This construction enables five modes of operation: 1) mirror at ~100% reflection; 2) mirror at ~50% reflection, display off; 3) mirror at ~50% reflection, display on; 4) mirror at first surface reflection (~4%), display off; and 5) mirror at first surface reflection (~4%), display on. Additional reflectance states may be obtained when using one or more switchable variable pitch cholesteric reflective polarizers in combination with an electrochromic element positioned between the viewer and the polarizer(s). If additional levels of reflectivity are desired, an electrochromic element may be disposed in front of the cholesteric element(s), or the cholesteric element(s) may be used alone to a two- or three-state variable reflectivity mirror.

As described further below, switchable variable pitch cholesteric reflective polarizers can also be used in vehicle windows, sunroofs, architectural windows, and skylights.

Another embodiment of the present invention is based on the recognition by the inventors that displays (particularly TFT LCD displays) emit light from well-defined relatively small light emitting areas constituting only about 30 percent of the total surface area of the display. According to this embodiment, very small holes or slits are created in a highly reflective coating and are aligned with the pattern of light emitting areas from the display. Each pixel has a hole positioned to allow light to pass with little attenuation toward the driver of defined user location. By creating holes of the correct size aligned with the emitting areas of the display, an average reflection percentage of 60% or higher can be achieved and still have very little attenuation at the points of transmission. Unlike the embodiments disclosed in the above-referenced U.S. Pat. No. 6,700,692, the holes or slits are much smaller and are used much more efficiently so as to reflect more light over a greater area in front of the display while not blocking much of any light from the display so as to provide a greater transmission percentage from the display. With this construction, the hole pattern may be provided over the entire mirror area and a large display may be provided behind a significant area of the mirror.

This concept can be enhanced in several ways. First the holes need not be round with uniform edges. Holes with complex edges can be made less visible. The hole regions can be made transflective to further disguise the hole. This sacrifices some transmission efficiency for better reflector appearance.

It is desirable to disguise the display region such that the display is more of an "on demand" display. This can be further enhanced by employing the hole pattern over the entire mirror area. It can be further enhanced by matching the reflection of the basic display regions in the regions not backed up by the display.

Further, there is another form allowing a very high reflection percentage and no attenuation of the display. This can be achieved by using a shutter action. The display top surface may carry a high reflection surface matching that of the mirror. When aligned (shutter open), holes in the display reflecting surface align with holes in the mirror reflecting surface and the display becomes visible. If the display is displaced, the holes in the mirror align with the reflecting surface of the display. This yields a 100% reflecting area. Since the reflecting surfaces can be in direct contact, the only optical distortion is due to the thickness of the mirror reflecting layer causing very small ridges around the holes. The resulting optical distortions are virtually invisible for viewing angles of use in rearview mirrors.

The shutter movement can be made using ceramic piezoelectric transducers. Movement can include a component to separate the surfaces as part of allowing the display to shine through. This would avoid any surface damage due to shutter movement.

The concept of aligning apertures through the reflector with the areas of display emission meets the challenge of creating a highly reflecting surface and having a high degree of display transmission because it separates the surface requirements. It has the effect of impacting only the display aperture regions. Thus the vast majority of the surface functions as well as a conventional reflector. As a result, means can be used in the aperture areas to switch between reflector and transmission that would not be suitable if applied over the entire area. This approach is inherently very robust as a failure only impacts the display holes not the primary reflecting surface.

There is a possible synergism between the above concept and ways of creating and removing reflecting surfaces using electro-chemical means, such as the reversible electro-deposition means disclosed in U.S. Pat. Nos. 5,903,382, 5,056, 899, 6,111,685, 6,166,847, 6,188,505, 6,310,714, and 6,433, 914, and in U.S. Patent Application Publication Nos. US 2005/0078347 A1 and US 2005/0111070 A1, the entire disclosures of which are incorporated herein by reference. In mirrors constructed using reversible electro-deposition, the reflective layer of the mirror is selectively and dynamically plated with reflective particles. The mirror exhibits a reflective state only when a voltage is applied. Thus, in the event of a failure, the mirrors are typically not reflective. Further, there are often challenges to obtaining a good specular reflector using reversible electro-deposition. Many of these problems can be addressed by using a permanent reflective layer having a plurality of apertures as discussed above and using the electro-deposition particles to only provide reflectivity in the apertures when the display is not in use. By using a nonconductive mask over all but the apertures corresponding to the light emitting areas of the display, the reflecting area produced by the electro-deposition particles can be grossly reduced and the impact of imperfections in the reforming process can be better tolerated. Lesser reflecting area and imperfection tolerance should result in much faster cycle times using lower currents. The display can be effected but the mirror area is always present so a fail to clear is assured.

A variation on "digital paper" is also a potential means to fill the apertures in the reflective layer thus raising reflection image quality. An example of "digital paper" is disclosed in U.S. Pat. No. 6,800,871, the entire disclosure of which is incorporated herein by reference. In this case, instead of rotating bi-colored particles as is done in "digital paper" applications, metallic particles are moved into and out of the aperture areas. This could be done by driving the metallic particles forward to the aperture areas and rearward to non-aperture areas. Indium tin oxide (ITO) or other transparent conductive coatings may be used over the apertures to create the field drawing these particles. Voltage on the surrounding surface and these particles move to the reflecting areas opening the apertures and when the aperture areas are charged the particles will fill the apertures.

The key in each case is that the apertures represent very small defect areas so less than perfect aperture surfaces will not create poor viewing conditions. Thus, means to fill the holes can be used that result in less than perfect surfaces in these holes.

By placing an optical device between the display and the mirror surface, light from the display can be converged so more light can be passed through a smaller aperture. The light converges to a very small diameter then diverges at the same angle. If the point of convergence to a smaller diameter is approximately aligned with the holes in the reflecting coating a much larger field of view may be achieved using smaller aperture holes and a greater spacing between the display and the mirror surface. This would be more practical when the reflector is provided on the third surface of the mirror element.

An appropriate optical device would be a plastic sheet with molded lens details for every pixel. Light from the display radiates to the lens where it is converged, through the reflecting layer hole and then diverges at the same angle as the convergence. To the viewer the display regions seem larger and the display can be seen from angles greater than could be achieved if the optical device were removed.

This sheet like optical element can be made by the same processes as those currently used to make lenticular lens sheets for auto-stereoscopic displays only in this case the lenses would be spherical. It should be noted an auto-stereoscopic display through a reflecting surface can also be made using this same basic idea only the hole patterns in the reflecting layer would be formed as narrow vertical slits.

Having generally described various aspects of the present invention, which may be used separately or in various combinations, more detailed descriptions are provided below of the various embodiments thereof.

FIG. 1 shows a rearview mirror system 100 constructed in accordance with the present invention. Mirror system 100 includes an inside rearview mirror assembly 110 and may include one or more outside rearview mirror assemblies 111a and 111b for the driver-side and passenger-side, respectively, all of which are adapted to be installed on a motor vehicle in a conventional manner and where the mirrors face the rear of the vehicle and can be viewed by the driver of the vehicle to provide a rearward view. Inside mirror assembly 110 and outside rearview mirror assemblies 111a and 111b may be electro-optic and thus may incorporate light-sensing electronic circuitry of the type illustrated and described in U.S. Pat. No. 5,204,778 or U.S. Pat. No. 5,451,822, and other circuits capable of sensing glare and ambient light and supplying a drive voltage to the electro-optic element. Mirror assemblies 110, 111a, and 111b are essentially identical in that like numbers identify components of the inside and outside mirrors. These components may be slightly different in configuration, but function in substantially the same manner and obtain substantially the same results as similarly numbered components. For example, the shape of the front glass element of inside mirror 110 is generally longer and narrower than outside mirrors 111a and 111b. There are also some different performance standards placed on inside mirror 110 compared with outside mirrors 111a and 111b. Also, in the United States (as supplied by the automobile manufacturers), the passenger-side mirror 111b typically has a spherically bent or convex shape, whereas the driver-side mirror 111a and inside mirror 110 presently must be flat. In Europe, the driver-side mirror 111a is commonly flat or aspheric, whereas the passenger-side mirror 111b has a convex shape. In Japan, both outside mirrors have a convex shape. The following description is generally applicable to all mirror assemblies of the present invention.

Figure 2:
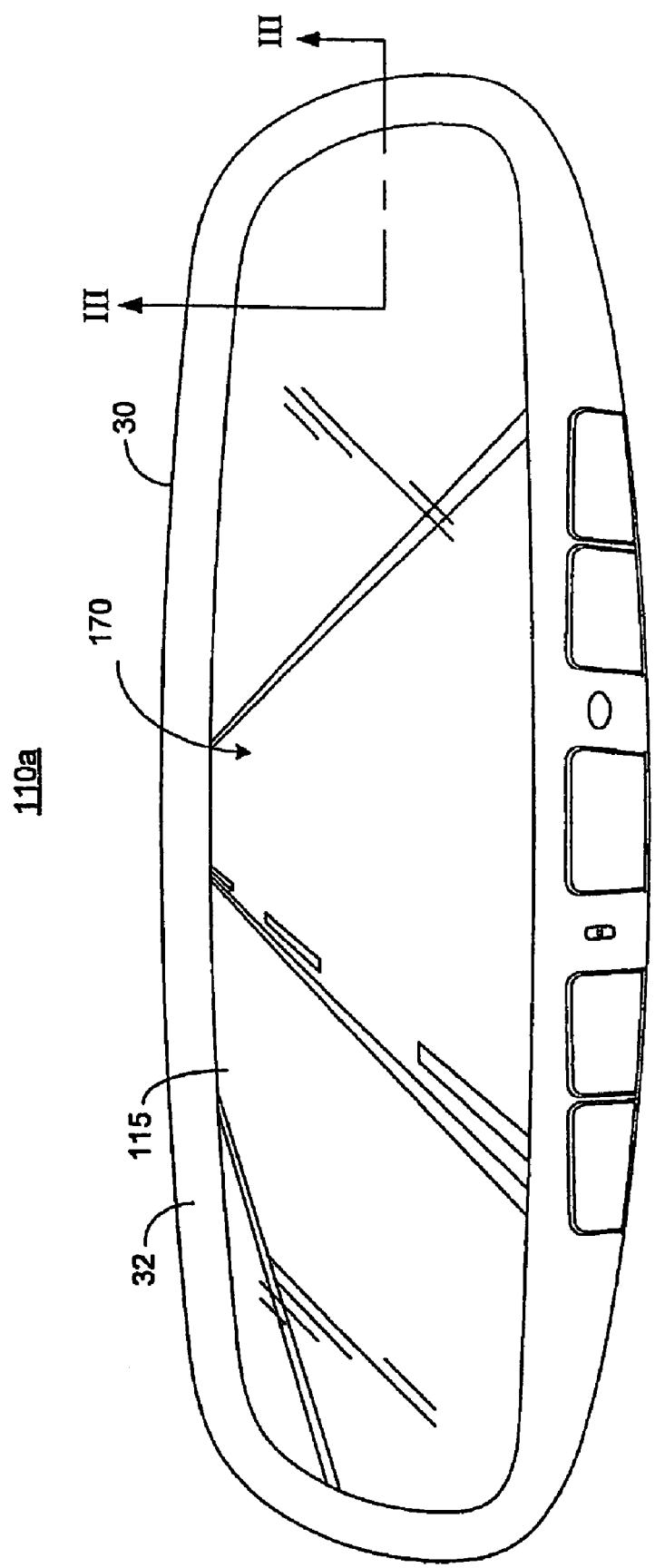
FIG. 2 is a front elevational view schematically illustrating an inside rearview mirror assembly constructed in accordance with one embodiment of the present invention.

FIG. 2 shows an inside rearview mirror assembly 110a constructed in accordance with one embodiment of the present invention. According to this embodiment, the mirror assembly may include a mirror element 115 having a polarized reflector 174 and a video display 170 for displaying a scene to the rear of the vehicle as captured by a camera 426 (FIG. 11). Video display 170 preferably is configured to emit light that is polarized in the same orientation as the polarized reflector 174, which is also preferably in the same orientation as transmitted through conventional polarizing sun glasses as may be worn by the driver.

Video display 170 may extend the entire area of the mirror assembly 110a or may only be provided across a portion of the mirror assembly. Video display 170 may be part of a rear vision system including one or more video cameras 426 that supply a video signal to display 170 for display thereon. The video camera(s) 426 may be mounted so as to capture images to the rear of the vehicle to assist the driver while backing up or to serve as a full time replacement or supplement to a rearview mirror. Examples of rear vision systems with which the present invention may be used are disclosed in commonly assigned U.S. Pat. No. 6,672,745 and in published U.S. Patent Application Publication No. 2003/0103141 A1, the entire disclosures of which are incorporated herein by reference.

As described below with respect to FIGS. 3A-3E, the structure of the mirror/display element used in rearview assembly 110a may vary.

FIG. 3A shows a cross-sectional view of a first example of an electrochromic mirror element 115a that may be used in mirror assembly 110a. Electrochromic mirror element 115a has a front transparent element 112 having a front surface 112a and a rear surface 112b, and a rear element 114 having a front surface 114a and a rear surface 114b. For clarity of description of such a structure, the following designations will be used hereinafter. The front surface 112a of the front glass element will be referred to as the first surface, and the back surface 112b of the front glass element as the second surface. The front surface 114a of the rear glass element will be referred to as the third surface, and the back surface 114b of the rear glass element as the fourth surface. A chamber 125 is defined by a layer of transparent conductor 128 (carried on second surface 112b), an electrode 120 (disposed on third surface 114*a*), and an inner circumferential wall 132 of sealing member 116. An electrochromic medium 126 is contained within chamber 125.

As broadly used and described herein, the reference to an electrode or layer as being "carried" on a surface of an element, refers to both electrodes or layers that are disposed directly on the surface of an element or disposed on another coating, layer or layers that are disposed directly on the surface of the element.

Front transparent element 112 may be any material which is transparent and has sufficient strength to be able to operate in the conditions, e.g., varying temperatures and pressures, commonly found in the automotive environment. Front element 112 may comprise any type of borosilicate glass, soda lime glass, float glass, or any other material, such as, for example, a polymer or plastic, that is transparent in the visible region of the electromagnetic spectrum. Front element 112 is preferably a sheet of glass. The rear element 114 should meet the operational conditions outlined above, except that it does not need to be transparent in all applications, and therefore may comprise polymers, metals, glass, ceramics, and preferably is a sheet of glass.

The coatings of the third surface 114*a* are sealably bonded to the coatings on the second surface 112*b* in a spaced-apart and parallel relationship by a seal member 116 disposed near the outer perimeter of both second surface 112*b* and third surface 114*a*. Seal member 116 may be any material that is capable of adhesively bonding the coatings on the second surface 112*b* to the coatings on the third surface 114*a* to seal the perimeter such that electrochromic material 126 does not leak from chamber 125. Optionally, the layer of transparent conductive coating 128 and the layer of reflector/electrode 120 may be removed over a portion where the seal member is disposed (not the entire portion, otherwise the drive potential could not be applied to the two coatings). In such a case, seal member 116 should bond well to glass.

The performance requirements for a perimeter seal member 116 used in an electrochromic device are similar to those for a perimeter seal used in a liquid crystal device (LCD), which are well known in the art. The seal preferably has good adhesion to glass, metals and metal oxides; has low permeabilities for oxygen, moisture vapor, and other detrimental vapors and gases; and does not interact with or poison the electrochromic or liquid crystal material it is meant to contain and protect. The perimeter seal can be applied by means commonly used in the LCD industry, such as by silk-screening or dispensing. Totally hermetic seals, such as those made with glass frit or solder glass, can be used, but the high temperatures involved in processing (usually near 450° C.) this type of seal can cause numerous problems, such as glass substrate warpage, changes in the properties of transparent conductive electrode, and oxidation or degradation of the reflector. Because of their lower processing temperatures, thermoplastic, thermosetting or UV curing organic sealing resins are preferred. Such organic resin sealing systems for LCDs are described in U.S. Pat. Nos. 4,297,401, 4,418,102, 4,695,490, 5,596,023, and 5,596,024. Because of their excellent adhesion to glass, low oxygen permeability and good solvent resistance, epoxy-based organic sealing resins are preferred. These epoxy resin seals may be UV curing, such as described in U.S. Pat. No. 4,297,401, or thermally curing, such as with mixtures of liquid epoxy resin with liquid polyamide resin or dicyandiamide, or they can be homopolymerized. The epoxy resin may contain fillers or thickeners to reduce flow and shrinkage such as fumed silica, silica, mica, clay, calcium carbonate, alumina, etc., and/or pigments to add color. Fillers pretreated with hydrophobic or silane surface treatments are preferred. Cured resin crosslink density can be controlled by use of mixtures of mono-functional, di-functional, and multi-functional epoxy resins and curing agents. Additives such as silanes or titanates can be used to improve the seal's hydrolytic stability, and spacers such as glass beads or rods can be used to control final seal thickness and substrate spacing. Suitable epoxy resins for use in a perimeter seal member 116 include, but are not limited to: "EPON RESIN" 813, 825, 826, 828, 830, 834, 862, 1001F, 1002F, 2012, DPS-155, 164, 1031, 1074, 58005, 58006, 58034, 58901, 871, 872, and DPL-862 available from Shell Chemical Co., Houston, Tex.; "ARALITE" GY 6010, GY 6020, CY 9579, GT 7071, XU 248, EPN 1139, EPN 1138, PY 307, ECN 1235, ECN 1273, ECN 1280, MT 0163, MY 720, MY 0500, MY 0510, and PT 810 available from Ciba Geigy, Hawthorne, N.Y.; and "D.E.R." 331, 317, 361, 383, 661, 662, 667, 732, 736, "D.E.N." 431, 438, 439 and 444 available from Dow Chemical Co., Midland, Mich. Suitable epoxy curing agents include V-15, V-25, and V-40 polyamides from Shell Chemical Co.; "AJICURE" PN-23, PN-34, and VDH available from Ajinomoto Co., Tokyo, Japan; "CUREZOL" AMZ, 2MZ, 2E4MZ, C11Z, C17Z, 2PZ, 2IZ, and 2P4MZ available from Shikoku Fine Chemicals, Tokyo, Japan; "ERISYS" DDA or DDA accelerated with U-405, 24EMI, U-410, and U-415 available from CVC Specialty Chemicals, Maple Shade, N.J.; and "AMICURE" PACM, 352, CG, CG-325, and CG-1200 available from Air Products, Allentown, Pa. Suitable fillers include fumed silica such as "CAB-O-SIL" L-90, LM-130, LM-5, PTG, M-5, MS-7, MS-55, TS-720, HS-5, and EH-5 available from Cabot Corporation, Tuscola, Ill.; "AEROSIL" R972, R974, R805, R812, R812S, R202, US204, and US206 available from Degussa, Akron, Ohio. Suitable clay fillers include BUCA, CATALPO, ASP NC, SATINTONE 5, SATINTONE SP-33, TRANSLINK 37, TRANSLINK 77, TRANSLINK 445, and TRANSLINK 555 available from Engelhard Corporation, Edison, N.J. Suitable silica fillers are SILCRON G-130, G-300, G-100-T, and G-100 available from SCM Chemicals, Baltimore, Md. Suitable silane coupling agents to improve the seal's hydrolytic stability are Z-6020, Z-6030, Z-6032, Z-6040, Z-6075, and Z-6076 available from Dow Corning Corporation, Midland, Mich. Suitable precision glass microbead spacers are available in an assortment of sizes from Duke Scientific, Palo Alto, Calif.

The layer of a transparent electrically conductive material 128 is deposited on the second surface 112*b* to act as an electrode. Transparent conductive material 128 may be any material which bonds well to front element 112, is resistant to corrosion to any materials within the electrochromic device, resistant to corrosion by the atmosphere, has minimal diffuse or specular reflectance, high light transmission, near neutral coloration, and good electrical conductance. Transparent conductive material 128 may be fluorine-doped tin oxide, doped zinc oxide, indium zinc oxide ($Zn_3In_2O_6$), indium tin oxide (ITO), ITO/metal/ITO (IMI) as disclosed in "Transparent Conductive Multilayer-Systems for FPD Applications," by J. Stollenwerk, B. Ocker, K. H. Kretschmer of LEYBOLD AG, Alzenau, Germany, the materials described in above-referenced U.S. Pat. No. 5,202,787, such as TEC 20 or TEC 15, available from Libbey Owens-Ford Co. of Toledo, Ohio, or other transparent conductors. Generally, the conductance of transparent conductive material 128 will depend on its thickness and composition. IMI generally has superior conductivity compared with the other materials. IMI is, however, known to undergo more rapid environmental degradation and suffer from interlayer delamination. The thickness of the various layers in the IMI structure may vary, but generally the thickness of the first ITO layer ranges from about 10 Å to about 200 Å, the metal ranges from about 10 Å to about 200 Å, and the second layer of ITO ranges from about 10 Å to about 200 Å. If desired, an optional layer or layers of a color suppression material 130 may be deposited between transparent conductive material 128 and the second surface 112b to suppress the reflection of any unwanted portions of the electromagnetic spectrum.

In accordance with the embodiment shown in FIG. 3A, a combination reflector/electrode 120 is disposed on third surface 114a. Reflector/electrode 120 may include a "wire grid" polarizing structure 174 discussed above and may optionally include an additional layer 176. As mentioned above, this additional layer 176 may be a layer of a transparent conductive material or may be a reflective conductive material.

FIG. 4 shows a magnified view of area IV shown in FIG. 3A. As shown, the wire grid reflective polarizer 174 includes a plurality of closely spaced, narrow parallel strips 175 of silver, silver alloy, or other reflective material.

It is desirable in the construction of outside rearview mirrors to incorporate thinner glass in order to decrease the overall weight of the mirror so that the mechanisms used to manipulate the orientation of the mirror are not overloaded. Decreasing the weight of the device also improves the dynamic stability of the mirror assembly when exposed to vibrations. Alternatively, decreasing the weight of the mirror element may permit more electronic circuitry to be provided in the mirror housing without increasing the weight of the mirror housing. Heretofore, no electrochromic mirrors incorporating a solution-phase electrochromic medium and two thin glass elements have been commercially available, because thin glass suffers from being flexible and prone to warpage or breakage, especially when exposed to extreme environments. This problem is substantially improved by using an improved electrochromic device incorporating two thin glass elements having an improved gel material. This improved device is disclosed in commonly assigned U.S. Pat. No. 5,940,201 entitled "ELECTROCHROMIC MIRROR WITH TWO THIN GLASS ELEMENTS AND A GELLED ELECTROCHROMIC MEDIUM," filed on Apr. 2, 1997. The entire disclosure of this patent is incorporated herein by reference. The addition of the combined reflector/electrode onto the third surface of the device further helps remove any residual double imaging resulting from the two glass elements being out of parallel. Thus, in accordance with the present invention, chamber 125 contains a free-standing gel that cooperatively interacts with thin glass elements 112 and 114 to produce a mirror that acts as one thick unitary member rather than two thin glass elements held together only by a seal member. In free-standing gels, which contain a solution and a cross-linked polymer matrix, the solution is interspersed in a polymer matrix and continues to function as a solution. Also, at least one solution-phase electrochromic material is in solution in the solvent and therefore as part of the solution is interspersed in the polymer matrix (this generally being referred to as "gelled electrochromic medium" 126). This allows one to construct a rearview mirror with thinner glass in order to decrease the overall weight of the mirror while maintaining sufficient structural integrity so that the mirror will survive the extreme conditions common to the automobile environment. This also helps maintain uniform spacing between the thin glass elements which improves uniformity in the appearance (e.g., coloration) of the mirror. This structural integrity results because the free-standing gel, the first glass element 112, and the second glass element 114, which individually have insufficient strength characteristics to work effectively in an electrochromic mirror, couple in such a manner that they no longer move independently but act as one thick unitary member. This stability includes, but is not limited to, resistance to, flexing, warping, bowing and breaking, as well as improved image quality of the reflected image, e.g., less distortion, double image, color uniformity, and independent vibration of each glass element. However, while it is important to couple the front and rear glass elements, it is equally important (if not more so) to ensure that the electrochromic mirror functions properly. The free-standing gel should bond to the electrode layers (including the reflector/electrode if the mirror has a third surface reflector) on the walls of such a device, but not interfere with the electron transfer between the electrode layers and the electrochromic material(s) disposed in the chamber 125. Further, the gel should not shrink, craze, or weep over time such that the gel itself causes poor image quality. Ensuring that the free-standing gel bonds well enough to the electrode layers to couple the front and rear glass elements and does not deteriorate over time, while allowing the electrochromic reactions to take place as though they were in solution, is an important aspect of the present invention.

To perform adequately, a mirror should accurately represent the reflected image, and this cannot be accomplished when the glass elements (to which the reflector is attached) tend to bend or bow while the driver is viewing the reflected image. The bending or bowing occurs mainly due to pressure points exerted by the mirror mounting and adjusting mechanisms and by differences in the coefficients of thermal expansion of the various components that are used to house the exterior mirror element. These components include a carrier plate used to attach the mirror element to the mechanism used to manipulate or adjust the position of the mirror (bonded to the mirror by an adhesive), a bezel, and a housing. Many mirrors also typically have a potting material as a secondary seal. Each of these components, materials, and adhesives have varying coefficients of thermal expansion that will expand and shrink to varying degrees during heating and cooling and will exert stress on the glass elements 112 and 114. On very large mirrors, hydrostatic pressure becomes a concern and may lead to double imaging problems when the front and rear glass elements bow out at the bottom and bow in at the top of the mirror. By coupling the front and rear glass elements the thin glass/free-standing gel/thin glass combination act as one thick unitary member (while still allowing proper operation of the electrochromic mirror) and thereby reduce or eliminate the bending, bowing, flexing, double image, and distortion problems and non-uniform coloring of the electrochromic medium.

The cooperative interaction between the free-standing gel and the thin glass elements of the present invention also improves the safety aspects of the electrochromic mirror 110 having thin glass elements. In addition to being more flexible, thin glass is more prone to breakage than thick glass. By coupling the free-standing gel with the thin glass, the overall strength is improved (as discussed above) and further restricts shattering and scattering and eases clean-up in the case of breakage of the device.

The improved cross-linked polymer matrix used in the present invention is disclosed in commonly assigned U.S. Pat. No. 5,928,572 entitled "ELECTROCHROMIC LAYER AND DEVICES COMPRISING SAME" filed on Mar. 15, 1996, and the International patent application filed on or about Mar. 15, 1997, and claiming priority to this U.S. patent. The entire disclosures of these two applications, including the references contained therein, are hereby incorporated herein by reference.

Typically, electrochromic mirrors are made with glass elements having a thickness of about 2.3 mm. The preferred thin glass elements according to the present invention have thicknesses of about 1.0 mm, which results in a weight savings of more than 50%. This decreased weight ensures that the mechanisms used to manipulate the orientation of an outside mirror element, commonly referred to as carrier plates, are not overloaded and further provides significant improvement in the vibrational stability of the mirror.

Front transparent element 112 may be any material which is thin and transparent and has sufficient strength to be able to operate in the conditions, e.g., varying temperatures and pressures, commonly found in the automotive environment. Front element 112 may comprise any type of glass, borosilicate glass, soda lime glass, float glass or any other material, such as, for example, a polymer or plastic, that is transparent in the visible region of the electromagnetic spectrum. Front element 112 is preferably a sheet of glass with a thickness ranging from 0.5 mm to about 1.8 mm, preferably from about 0.5 to 1.6 mm, more preferably from about 0.5 to 1.5, even more preferably from about 0.8 mm to about 1.2 mm, with the presently most preferred thickness about 1.0 mm. Rear element 114 should meet the operational conditions outlined above, except that it does not need to be transparent, and therefore may comprise polymers, metals, glass, ceramics, and preferably is a sheet of glass with a thickness in the same ranges as element 112.

When both glass elements are made thin, the vibrational properties of an interior or exterior mirror improve—although the effects are more significant for exterior mirrors. These vibrations that result from the engine running and/or the vehicle moving affect the rearview mirror, such that the mirror essentially acts as a weight on the end of a vibrating cantilever beam. This vibrating mirror causes blurring of the reflected image that is a safety concern as well as a phenomenon that is displeasing to the driver. As the weight on the end of the cantilever beam (i.e., the mirror element attached to the carrier plate on the outside mirror or the mirror mount on the inside mirror) is decreased, the frequency at which the mirror vibrates increases. If the frequency of the mirror vibration increases to around 60 Hertz, the blurring of the reflected image is not visually displeasing to the vehicle occupants. Moreover, as the frequency at which the mirror vibrates increases, the distance the mirror travels while vibrating decreases significantly. Thus, by decreasing the weight of the mirror element, the complete mirror becomes more vibrationally stable and improves the ability of the driver to view what is behind the vehicle. For example, an interior mirror with two glass elements having a thickness of 1.1 mm has a first mode horizontal frequency of about 55 Hertz whereas a mirror with two glass elements of 2.3 mm has a first mode horizontal frequency of about 45 Hertz. This 10 Hertz difference produces a significant improvement in how a driver views a reflected image.

In the assembly and manufacture of electrochromic devices, polymeric beads may be applied to the electrochromic mirror area on the viewing area of the second or third surface, i.e., inboard of the perimeter seal, to temporarily maintain proper cell spacing during the manufacturing process. These beads are even more useful with devices having thin glass elements because they help prevent distortion and double image during device manufacture and maintain a uniform electrochromic medium thickness until gellation occurs. It is desirable that these beads comprise a material that will dissolve in the electrochromic medium and is benign to the electrochromic system while being compatible with whatever electrochromic system is contained within the chamber 125 (e.g., the constituents of gelled layer). While the use of PMMA beads is known, it is not preferred because they have the following disadvantages: they require a heat cycle (generally at least 2 hours at 85 degrees C.) to dissolve, they do not dissolve before the preferred gels of the present invention crosslink, they can cause light refracting imperfections in gelled and non-gelled electrochromic devices, and they can cause the electrochromic medium to color and clear more slowly near the area where beads were prior to dissolving.

Referring again to FIG. 3A, chamber 125, defined by transparent conductor 128 (disposed on front element rear surface 112b), reflector/electrode 120 (disposed on rear element front surface 114a), and an inner circumferential wall 132 of sealing member 116, contains an electrochromic medium 126. Electrochromic medium 126 is capable of attenuating light traveling therethrough and has at least one solution-phase electrochromic material in intimate contact with reflector/electrode 120 and at least one additional electroactive material that may be solution-phase, surface-confined, or one that plates out onto a surface. However, the presently preferred media are solution-phase redox electrochromics, such as those disclosed in above-referenced U.S. Pat. Nos. 4,902,108, 5,128,799, 5,278,693, 5,280,380, 5,282,077, 5,294,376, and 5,336,448. U.S. Pat. No. 6,020,987, entitled "ELECTROCHROMIC MEDIUM CAPABLE OF PRODUCING A PRE-SELECTED COLOR," discloses electrochromic media that are perceived to be gray throughout their normal range of operation. The entire disclosure of this patent is hereby incorporated herein by reference. If a solution-phase electrochromic medium is utilized, it may be inserted into chamber 125 through a sealable fill port 142 through well-known techniques, such as vacuum backfilling and the like.

An electrical circuit (not shown), such as those taught in Canadian Patent No. 1,300,945 and U.S. Pat. Nos. 5,204,778, 5,434,407, and 5,451,822, is connected to and allows control of the potential to be applied across reflector/electrode 120 and transparent electrode 128, such that electrochromic medium 126 will darken and thereby attenuate various amounts of light traveling therethrough and thus vary the reflectance of the mirror containing electrochromic medium 126.

Figure 3C:
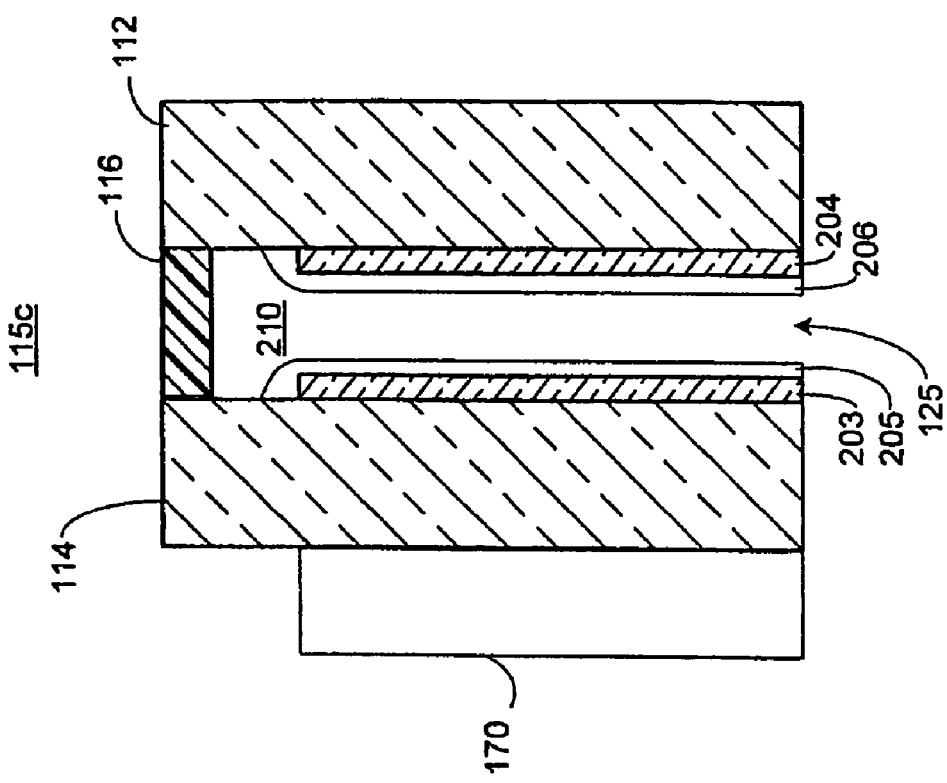
FIG. 3C is a cross-sectional view of the rearview mirror element shown in FIG. 2 as taken along line III-III according to another embodiment of the present invention.
Figure 3B:
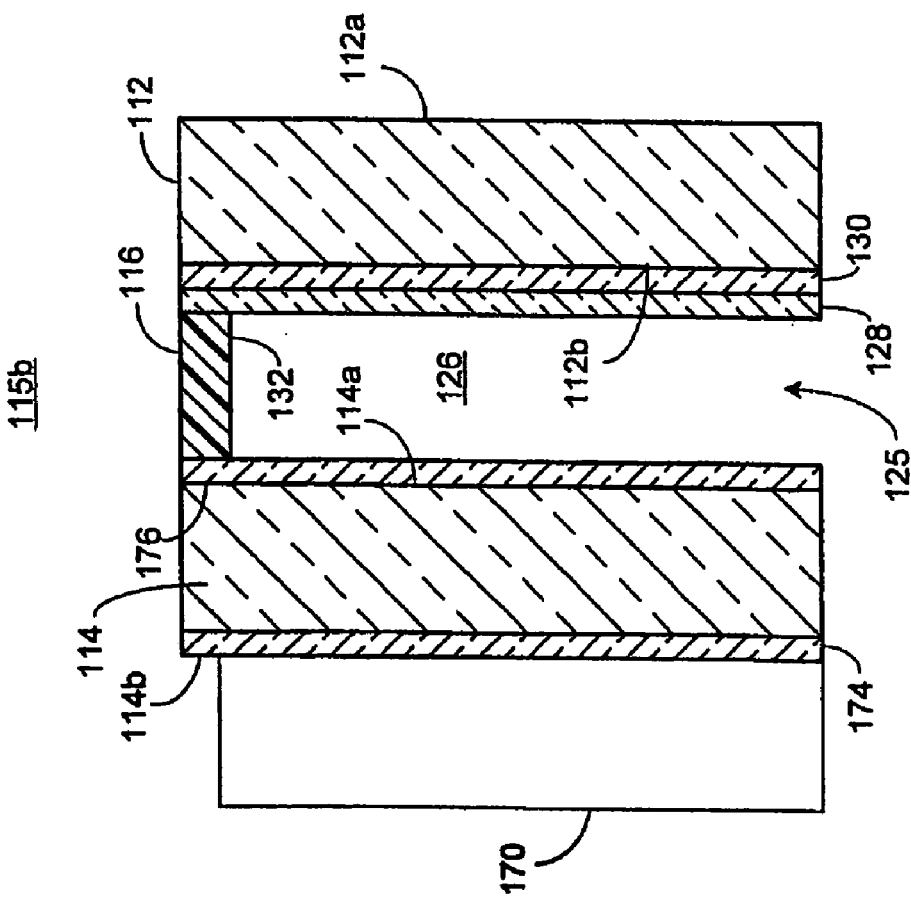
FIG. 3B is a cross-sectional view of the rearview mirror element shown in FIG. 2 as taken along line III-III according to another embodiment of the present invention.

FIG. 3B shows a cross-sectional view of a second example of an electrochromic mirror element 115b that may be used in mirror assembly 110a. The second embodiment differs from the first embodiment shown in FIG. 3A in that the reflective polarizing "wire grid" is provided on the fourth surface 114b of the electrochromic mirror element, while an electrode 176 is provided on third surface 114a. Electrode 176 may be a transparent conductive material similar to electrode 128 or may be transflective.

Although the two embodiments described above and shown in FIGS. 3A and 3B include electrochromic elements 115a and 115b, other forms of electro-optic elements may also be used, such as an LCD or the like.

FIG. 3C shows a cross-sectional view of another example of a mirror element 115c that may be used in mirror assembly 110a. Mirror element 115c includes a cholesteric element comprising a first substrate 112, a second substrate 114 and a seal 116 disposed therebetween. A chamber 125 is formed between the substrates. The cholesteric element further comprises transparent electrodes 203 and 204 provided on opposing surfaces of substrates 112 and 114, and orientation layers 205 and 206. A mixture 210 of polymerizable, cholesteric liquid crystalline molecules are provided within chamber 125. Further details of the construction of a suitable cholesteric element is disclosed in U.S. Pat. Nos. 5,762,823 and 5,798,057, the entire disclosures of which are incorporated herein by reference.

According to a variation on the above construction using an LCD as a mirror element, electrode 203 may be made of a reflective or a transflective material so as to function as a reflector in a similar manner by which third surface reflectors are used in electrochromic rearview mirrors. Many different metal depositions or combinations of multiple depositions can be used to achieve reflection, adhesion, conductivity, chemical compatibility, and windowing capability. One or more of the following materials can be chosen for deposition on the third surface in any order that preferably accomplishes one or more of the above goals: silver, silver alloys, chromium, ruthenium, palladium, platinum, indium-doped tin oxide (ITO), tin oxide (doped), zinc oxide (doped), aluminum, or $SiO_2$. Examples of third surface reflectors that could be used as electrode 203 are disclosed in U.S. Pat. Nos. 6,512,624, 6,356,376, 6,166,848, 6,111,684, 6,064,508, and 5,818,625, the entire disclosures of which are herein incorporated by reference. It will be appreciated that this aspect of the present invention may be used with forms of liquid crystalline molecules other than the cholesteric liquid crystalline molecules discussed above, and may be made with or without a display or other electronic element positioned behind the LCD element.

Figure 3D:
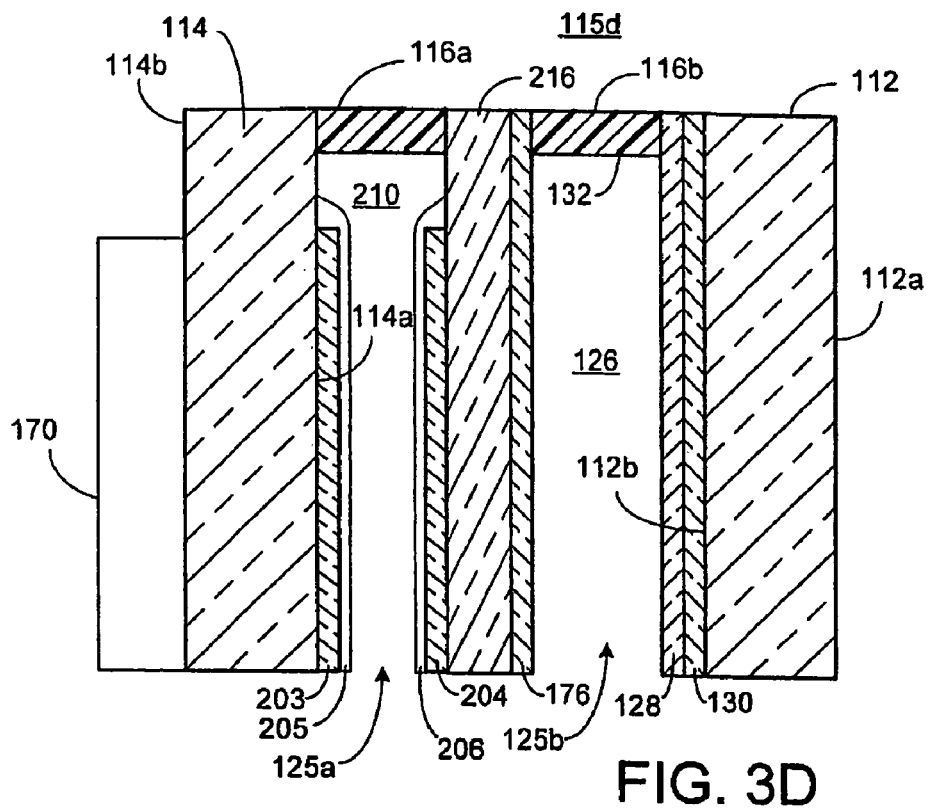
FIG. 3D is a cross-sectional view of the rearview mirror element shown in FIG. 2 as taken along line III-III according to another embodiment of the present invention.

FIG. 3D shows a cross-sectional view of another example of a mirror element 115d that may be used in mirror assembly 110a. Mirror element 115d includes both a cholesteric element and an electrochromic element. The combined structure includes an intermediate substrate 216 that is positioned between first substrate 112 and second substrate 114 with the electrochromic element disposed between first substrate 112 and intermediate substrate 216, and the cholesteric element disposed between intermediate substrate 216 and second substrate 114. Such a construction provides the benefit of a continuous variance in the reflectivity level of the mirror. The cholesteric element may be constructed as described above with respect to FIG. 3C, while the electrochromic element may be constructed as described above with respect to FIG. 3B with the exception that the fourth surface reflector 174 is not used as the cholesteric element serves as the reflector.

Figure 3E:
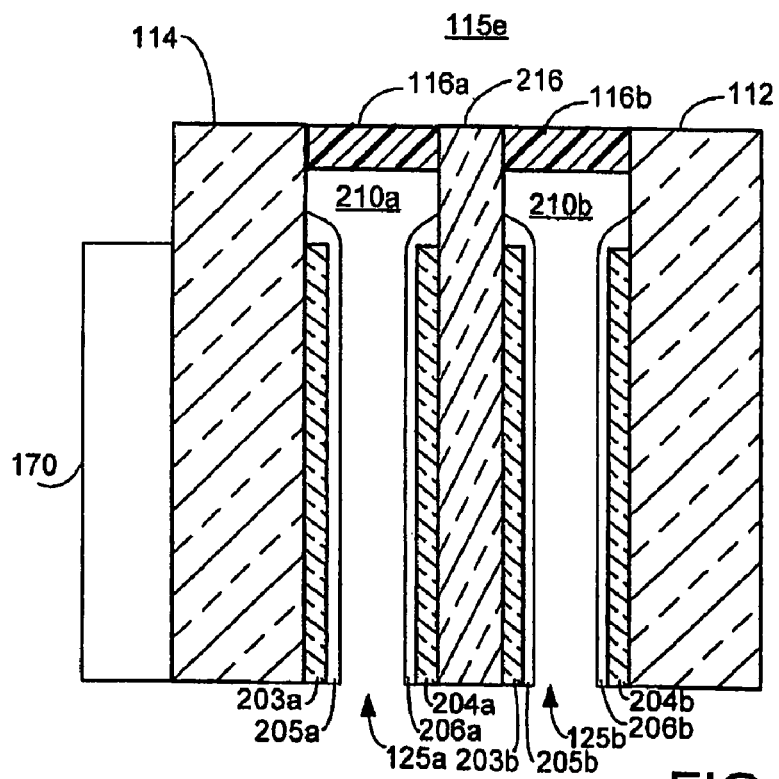
FIG. 3E is a cross-sectional view of the rearview mirror element shown in FIG. 2 as taken along line III-III according to another embodiment of the present invention.

FIG. 3E shows a cross-sectional view of another example of a mirror element 115e that may be used in mirror assembly 110a. Mirror element 115e includes two cholesteric elements separated by intermediate substrate 216. As discussed above, the use of two cholesteric elements provides additional states of reflectance/transmittance. The two cholesteric elements are constructed as described above with respect to FIG. 3C.

Figure 6:
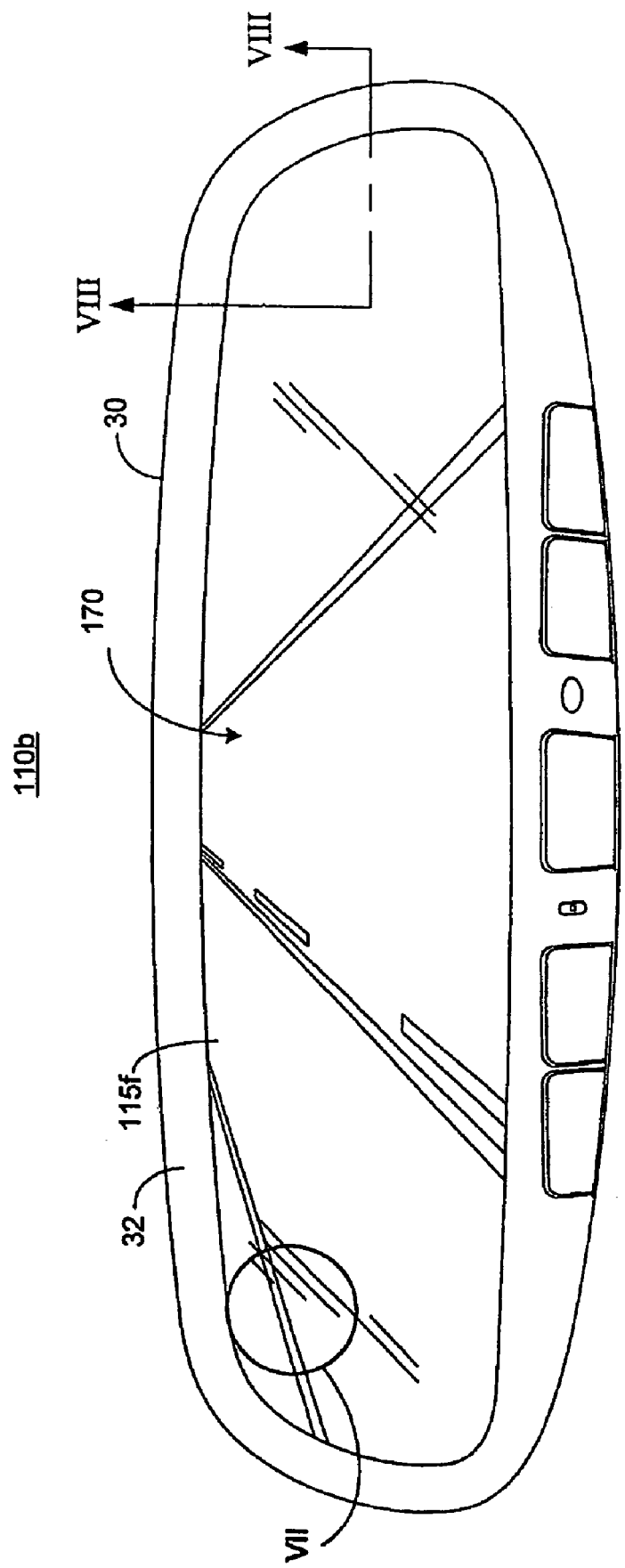
FIG. 6 is a front elevational view schematically illustrating an inside rearview mirror assembly constructed in accordance with another embodiment of the present invention.

FIG. 6 shows a rearview mirror assembly 110b constructed in accordance with another embodiment of the invention. Rather than using a mirror element with a polarized reflector, mirror assembly 110b uses a mirror element 115f having a reflector with a plurality of small holes or slits that align with the light emitting areas of the display.

Figure 7B:
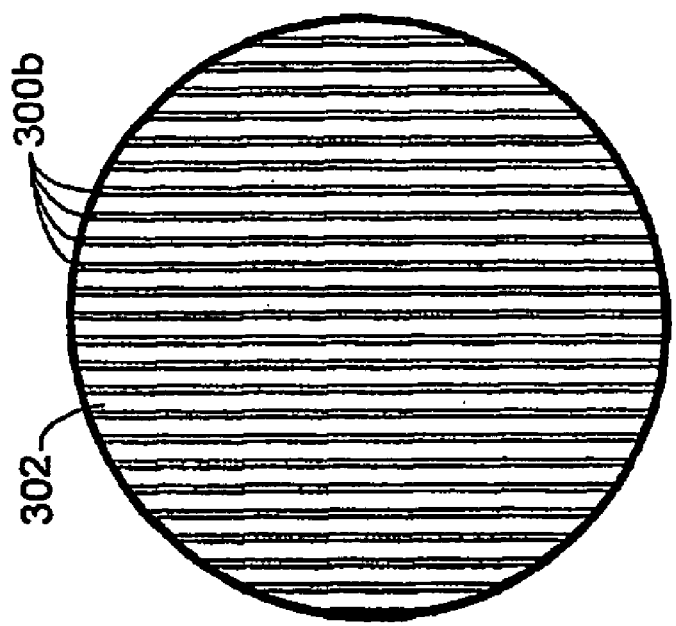
FIG. 7B is a close up view of area VII shown in FIG. 6 of an alternative construction from that shown in FIG. 7A.
Figure 7A:
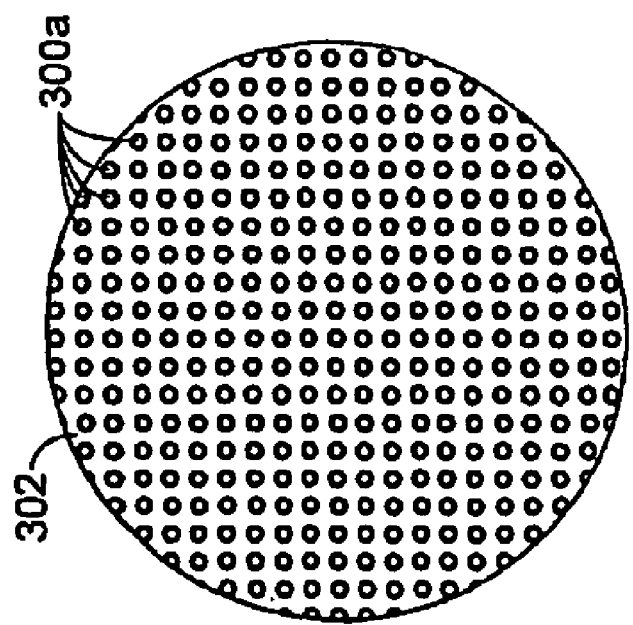
FIG. 7A is a close up view of area VII shown in FIG. 6.

FIG. 7A shows a close up of one construction of the mirror element using holes 300a formed in reflector 302. FIG. 7B shows a close up of one construction of the mirror element using slits 300b formed in reflector 302.

Figure 9A:
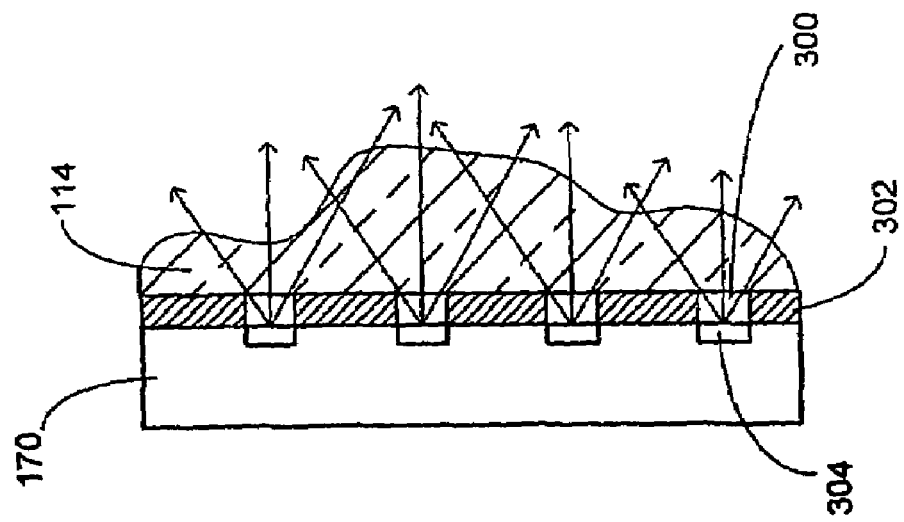
FIG. 9A is a close up view of area IX shown in FIG. 8.
Figure 8A:
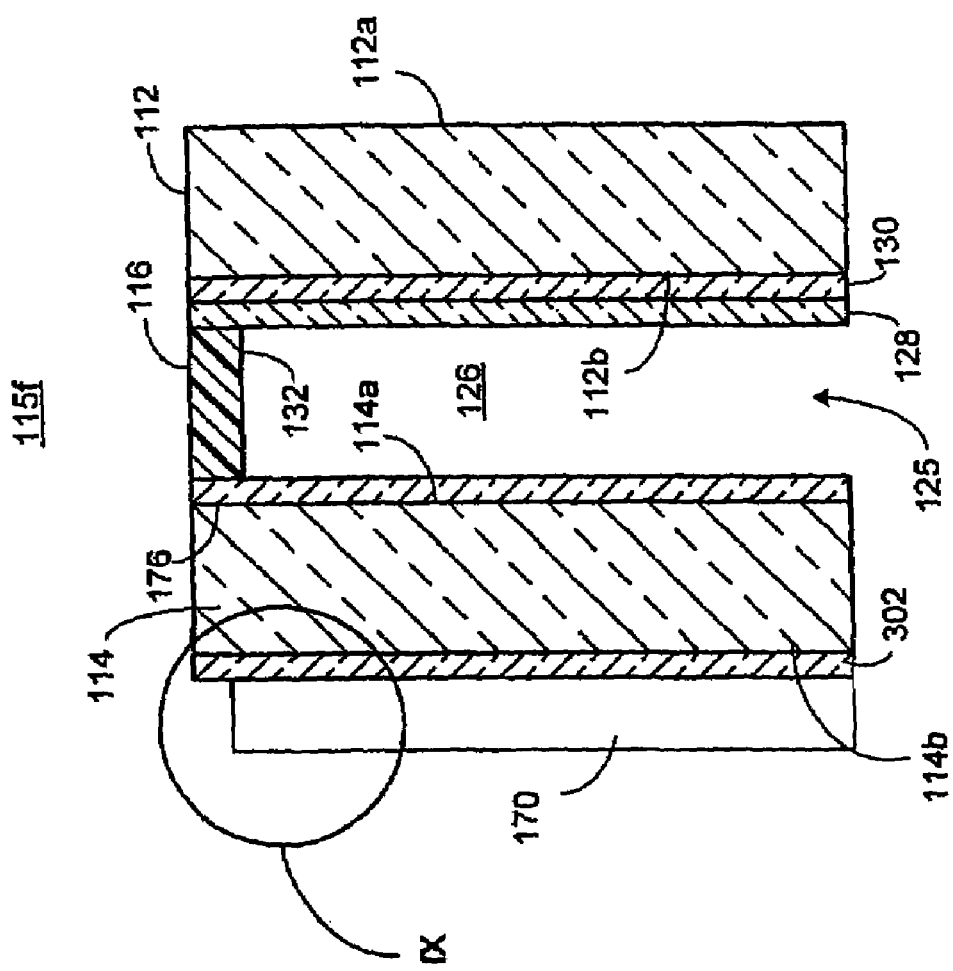
FIG. 8A is a cross-sectional view of the rearview mirror element shown in FIG. 6 as taken along line VIII-VIII according to one embodiment of the present invention.

FIG. 8A shows a partial cross-sectional view of mirror element 115f. As shown, mirror element 115f closely resembles mirror element 115b shown in FIG. 3B. Mirror element 115f differs, however, that in place of polarized reflector 174, a reflector 302 is provided that includes a plurality of holes 300a and/or slits 300b as shown in FIGS. 7A and 7B. As shown in FIG. 9A, the holes and slits (collectively referred to as "apertures 300") are sized and positioned to match the size and position of the light emitting areas 304 of display 170 and are aligned therewith so that light from the display can be emitted through apertures 300 unimpeded by reflector 302.

Figure 9D:
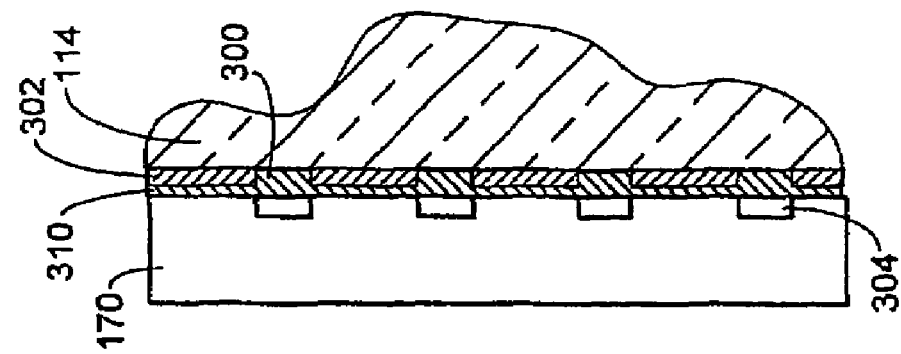
FIG. 9D is a close up view of area IX shown in FIG. 8 of an alternative construction from that shown in FIG. 9A.
Figure 9C:
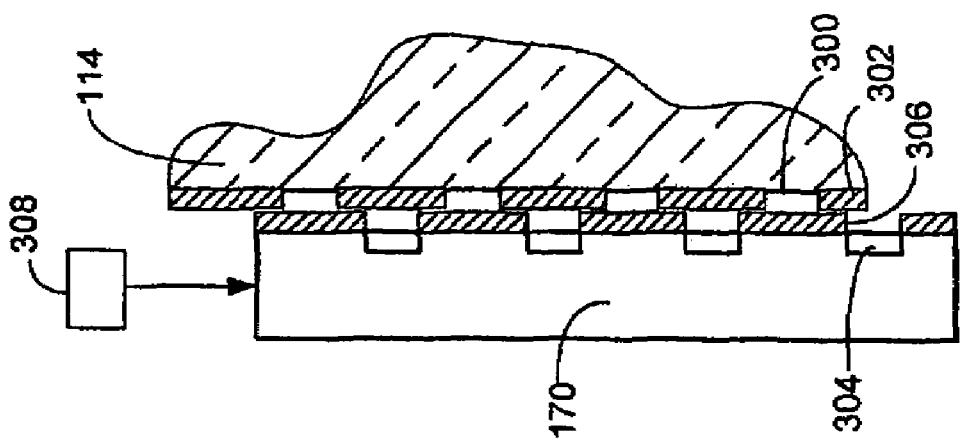
FIG. 9C is a close up view of area IX shown in FIG. 8 of the same construction as shown in FIG. 9B but with the display in a nonvisible position.
Figure 9B:
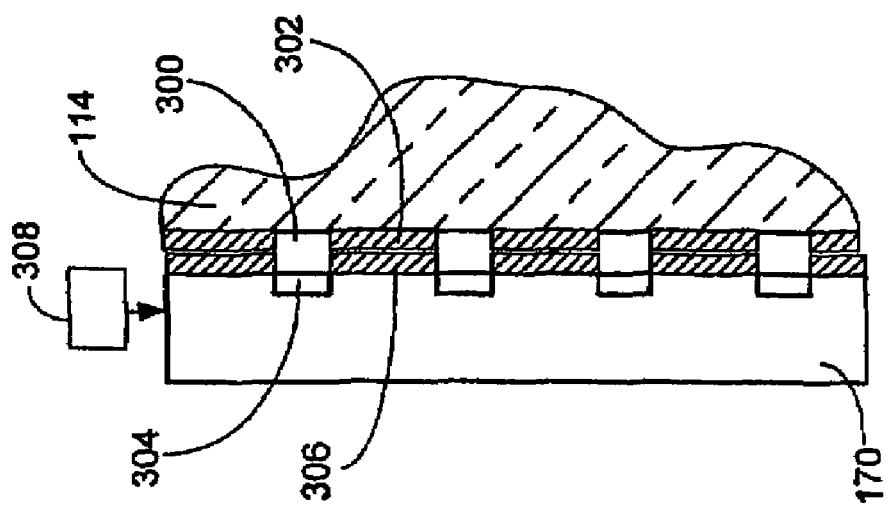
FIG. 9B is a close up view of area IX shown in FIG. 8 of an alternative construction from that shown in FIG. 9A with the display in a visible position.

FIGS. 9B and 9C show a variation on the construction shown in FIG. 9A, whereby the front surface of display 170 is coated with a reflective layer 306 except in the light emitting areas 304. As shown in FIG. 9B, the light from the display 170 may still be emitted without interference from reflective layer 306 or reflector 302. To better hide the display and improve reflectivity of mirror element 115f when display 170 is not activated, an actuator 308 is provided that shifts display 170 relative to mirror element 115f such that the light emitting areas 304 of display 170 no longer align with apertures 300 in reflector 302. This causes the reflective layer 306 on display 170 to align with apertures 300 so that any light from the front of the mirror that passes through apertures 300 will be reflected by reflective layer 306.

FIG. 9D shows another variation on the construction shown in FIG. 9A. Specifically, this construction differs in that a transflective (i.e., partially transmissive, partially reflective) layer 310 is coated over reflector 302 and within apertures 300 so that much of the light from light emitting areas 304 may still pass through apertures 300, while most of the light from the front of the mirror that would otherwise pass through apertures 300 will be reflected by transflective layer 310.

Figure 8C:
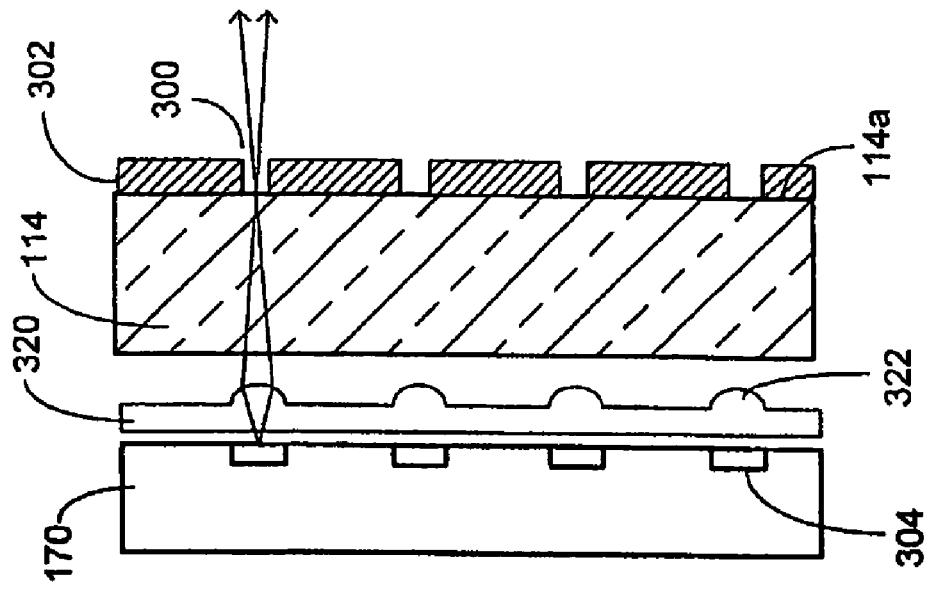
FIG. 8C is a cross-sectional view of the rearview mirror element shown in FIG. 6 as taken along line VIII-VIII according to another embodiment of the present invention.
Figure 8B:
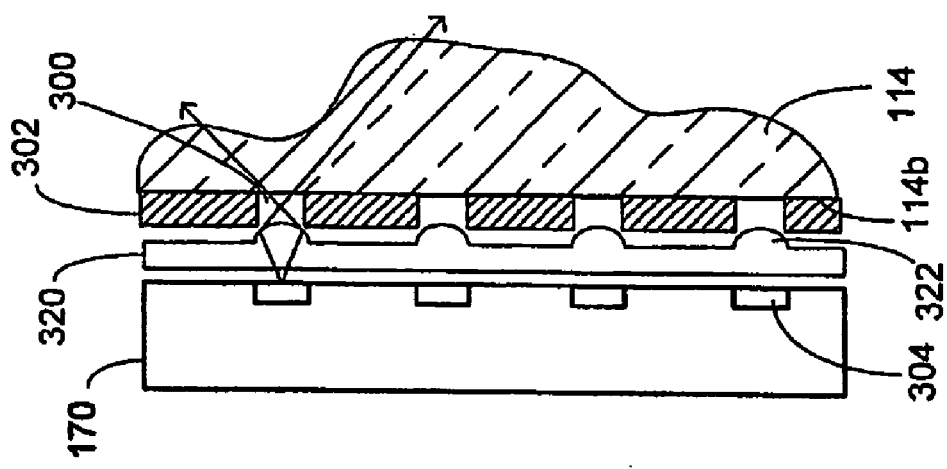
FIG. 8B is a cross-sectional view of the rearview mirror element shown in FIG. 6 as taken along line VIII-VIII according to another embodiment of the present invention.

FIG. 8B shows a variation on the construction of mirror element 115f shown in FIG. 8A. In this variation, an optical device 320 is provided between display 170 and reflector 302 that includes a plurality of lenses 322 each corresponding and aligned with a light emitting area 304 of display 170. As discussed above, by providing such an optical device 320, the lenses 322 may cause the normally divergent light emitted from light emitting areas 304 of display 170 to converge and then diverge. By selecting an appropriate lens power for lenses 322 and by appropriate positioning of apertures 300 relative to lenses 322, the light from display may be caused to converge to a small point of light where it passes through apertures 300 and then diverge after passing through apertures 300. This allows for the apertures 300 to be made even smaller.

FIG. 8C shows a modification to the construction shown in FIG. 8C whereby reflector 320 is provided on the third surface 114a of mirror element 115f, which is preferably an electrochromic mirror element. Additionally, the lens power of lenses 322 are adjusted to accommodate a greater distance to apertures 300, which are now on the opposite side of substrate 114.

Figure 10:
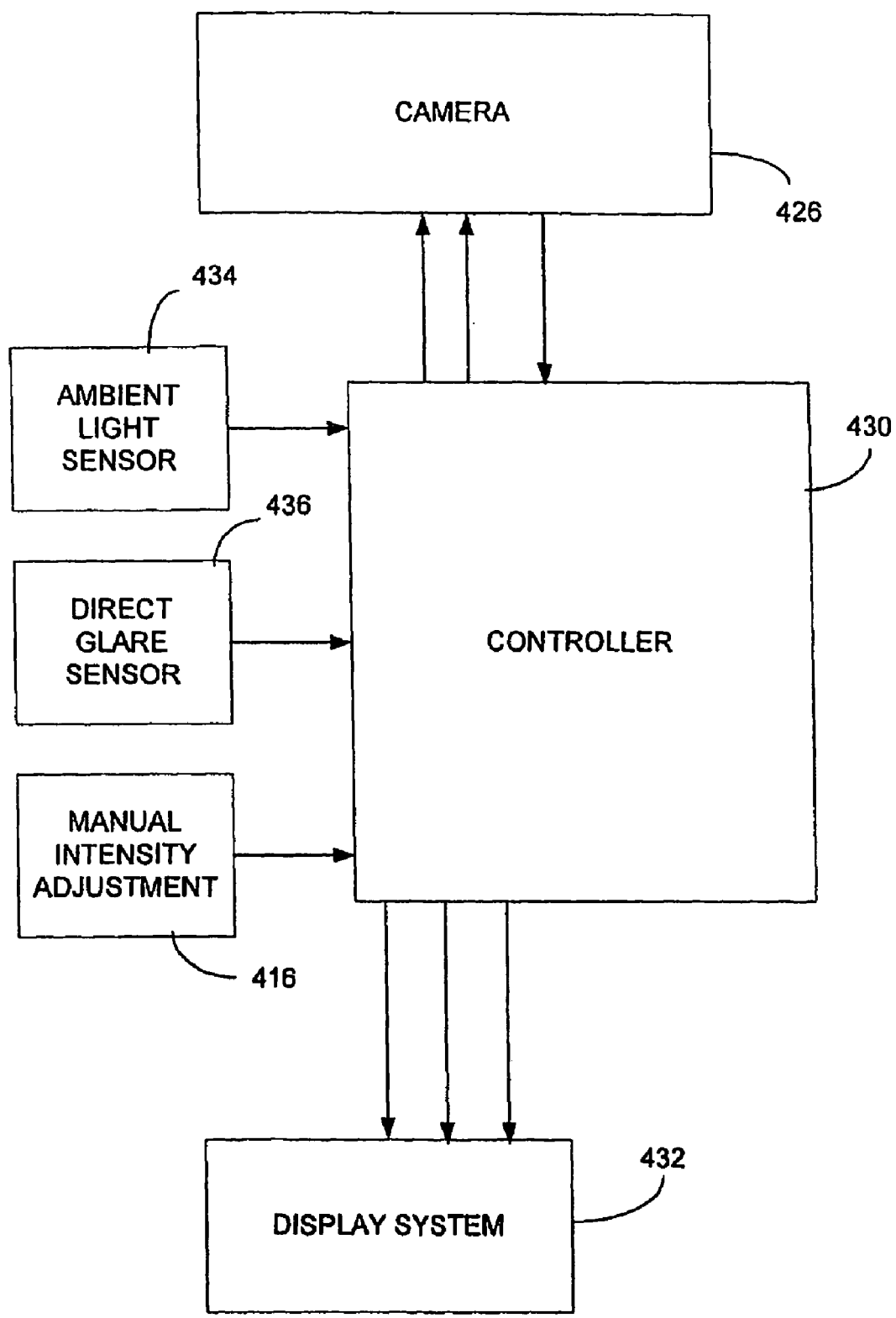
FIG. 10 is an electrical circuit diagram in block form of a rear vision system constructed in accordance with the present invention.

FIG. 10 discloses an electrical block diagram of an exemplary rear vision system for use in a vehicle. As shown, a camera 426 is coupled to a controller 430, which in turn is coupled to a display system 432 (that includes display 170). Camera 426 is mounted to the vehicle so as to capture an image to the rear of the vehicle. Controller 430 receives the camera images as well as input from an ambient sensor 434, a direct glare sensor 436, and a manual intensity adjustment mechanism 416 and generates a display signal for the display system 426 using these inputs. A detailed description of the preferred operation of such a rear vision system is disclosed in commonly assigned U.S. Patent Application Publication No. US 2003/0103141 A1, the entire disclosure of which is incorporated herein by reference.

As discussed herein, the display 170 is preferably located in rearview mirror assembly 110. The width to height aspect ratio of the image that is recorded and presented on typical video image display and camera systems is 4 to 3 (1.33 to 1) or 16 to 9 (1.78 to 1). This aspect ratio is not ideal for a display located in the interior mirror position of a vehicle. To display an image that is the full width of mirrors in vehicles today the display image would be between about 6 to 14 inches wide. If the height aspect ratio of a typical camera/video display were maintained the height of these mirrors would range from about 3.5 to 12 inches. The height of the reflective surface in a typical rearview mirror ranges from about 2 inches to about 3 inches. If the mirror is much higher it will begin to significantly block the forward view in a vehicle. This is a significant safety concern. It is therefore desirable to have a width to height aspect ratio of display 170 and camera 426 that is between 2 to 1 and 12 to 1 and more preferable to have and aspect ratio of the display and camera that has an aspect ratio between 3 to 1 and 6 to 1 and most preferable to have a display and camera system with an aspect ratio between 4 to 1 and 5 to 1.

Figure 5:
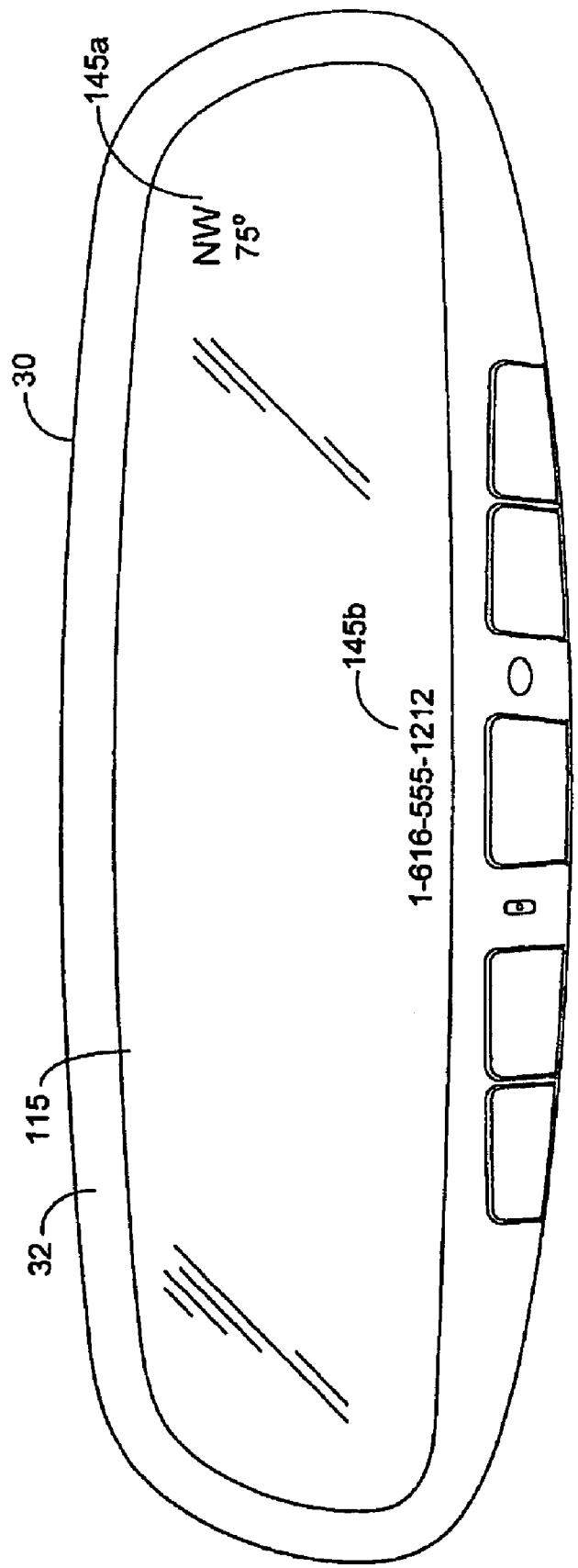
FIG. 5 is a front elevational view schematically illustrating an inside rearview mirror assembly constructed in accordance with a second embodiment of the present invention.

Although the above described embodiments have focused on the use of a video display 170, the above described mirror elements 115a, 115b, 115c, 115d, and 115e may also be used with other forms of displays and with light sources and light sensors. As shown in FIG. 5, for example, a rearview mirror assembly 110b may include one or more alphanumeric display 145a and 145b. Such displays may be configured to emit polarized light through the reflective polarizer 174 of the mirror element 115. Such displays may be of any conventional form and are preferably LCDs. The displays may also include indicia panels of the type disclosed in commonly assigned U.S. Pat. Nos. 6,572,233 and 6,356,376, the entire disclosures of which are incorporated herein by reference. Such indicia type displays may, for example, display vehicle heading and information relating to the enablement status of a passenger-side inflatable restraint system.

When the display(s) positioned behind the mirror element are smaller than the area of the mirror element, it is possible to construct the mirror element such that the reflective polarizer 174 is disposed only in front of the display such that the mirror element as a whole has a higher level of reflectance.

In addition to the foregoing structure, the various techniques disclosed in commonly assigned U.S. Pat. Nos. 6,356,376 and 6,700,692, the entire disclosures of which are incorporated herein by reference, to increase the contrast of the display may be used in conjunction with the above disclosed mirror elements.

Other approaches could be used to increase the contrast of the display (alphanumeric, video, or high resolution type). When maximum contrast is desired, such as when using the camera/display system to back up a vehicle, the transflective mirror could be tilted, for example, as in a prismatic mirror such that the high reflectivity mirror surface images the reflection of the darker vehicle roof or other area of the vehicle that is not "bright." In this way, the display would not compete with the light directly transmitted through the mirror window. Also, another approach that would remove the mirror completely from the display light path would be to hinge the mirror at the top (or bottom) and flip it out of the way as shown in FIG. 11A. For instance, if the transflective or opaque electro-optic mirror element 115a, 115b, 115c, 115d, 115e, or 115f (collectively referred to as "115") were hinged at the top of a bezel 32, the mirror element 115 could be flipped up so that it is perpendicular to a mirror housing 30 so that an unobstructed view of the video display 170 could be seen.

This could be done manually or automatically when needed such as when the vehicle is put in reverse. The inside surface around the video display 170 and the back of the flipped-up mirror element 115 could be black or dark in color to shield the display from ambient light and improve contrast. Side shields could also be added and/or the display 170 could be recessed in the mirror housing to further enhance contrast. The "flipped up" mirror element 115 would not block the driver field of view as in prior art where the display is flipped down or pulled down below the mirror assembly. When flipped down, as shown in FIG. 11B, the mirror element 115 could be used in the conventional manner.

FIGS. 12A and 12B show a variation on the embodiment shown in FIGS. 11A and 11B. In this variation, display 170 is pivotally attached to the mirror housing 30 instead of mirror element 115. Display 170 may also be moveably attached to housing 30 so as to be moved linearly outside or from within housing 30. In the particular example illustrated in FIGS. 12A and 12B, display 170 pivots from the bottom of mirror housing 30 backward behind the housing when not in use, and pivots downward below the mirror housing when in use. The display could be mounted elsewhere and flipped or slid up or down to be visible in various locations relative to the mirror housing. The display 170 could be automatically pivoted into a viewable position when, for example, the vehicle is put in reverse. The display could then be manually pushed back into a stowed position. Such an arrangement would allow for a relatively simple actuator mechanism to be used such as a mechanism including a biased latch that catches and holds the display support in a stowed position and releases the support when the vehicle is placed in reverse. It will be appreciated, however, that the display 170 may be automatically moved to the stowed position when the vehicle is placed in any gear other than reverse. Alternatively or additionally, an alarm signal may sound when the vehicle changes gear and the display is not in the proper position in order to prompt the driver to manually reposition the display 170. The display 170 may further be spring-assisted and or use an inertia gear to provide for a more deliberate and steady rate of movement.

It will further be appreciated that the mirror element structure discussed above may be used for outside mirror assemblies 111a and 111b having one or more light sources serving as turn signal light displays 145c. Further, various other light sources may be provided in an outside mirror assembly, which may be polarized so as to be advantageously combined with the mirror elements discussed above.

The present invention has been described as rearview assemblies incorporating particular forms of variable reflectivity mirrors in combination with displays. It will be appreciated by those skilled in the art that various other vehicle accessories and components may be incorporated in the rearview mirror assembly in whole or in part and in various combinations. Such vehicle accessories and components may be mounted within, on or to the mirror housing, the mirror mount, an attachment to the mirror mount or housing, or in a console or other housing associated with the rearview mirror assembly. Additionally, any such vehicle accessories may share components with one another, such as processors, sensors, power supplies, wire harnesses and plugs, displays, switches, antennae, etc. Examples of other vehicle accessories, components or features are described further below.

Figure 13A:
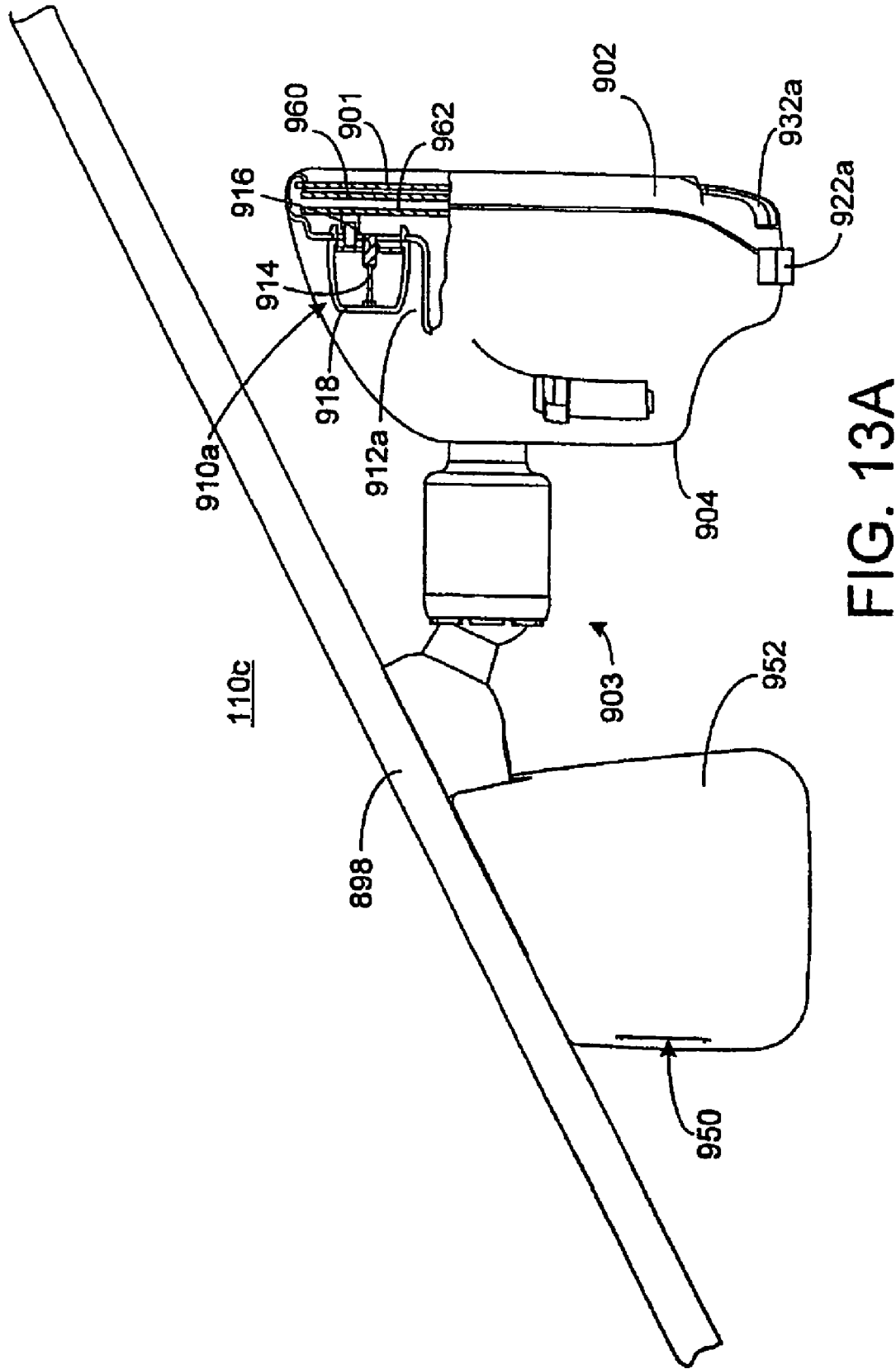
FIG. 13A is an elevational view of the side of a rearview mirror assembly constructed according to the present invention.
Figure 13B:
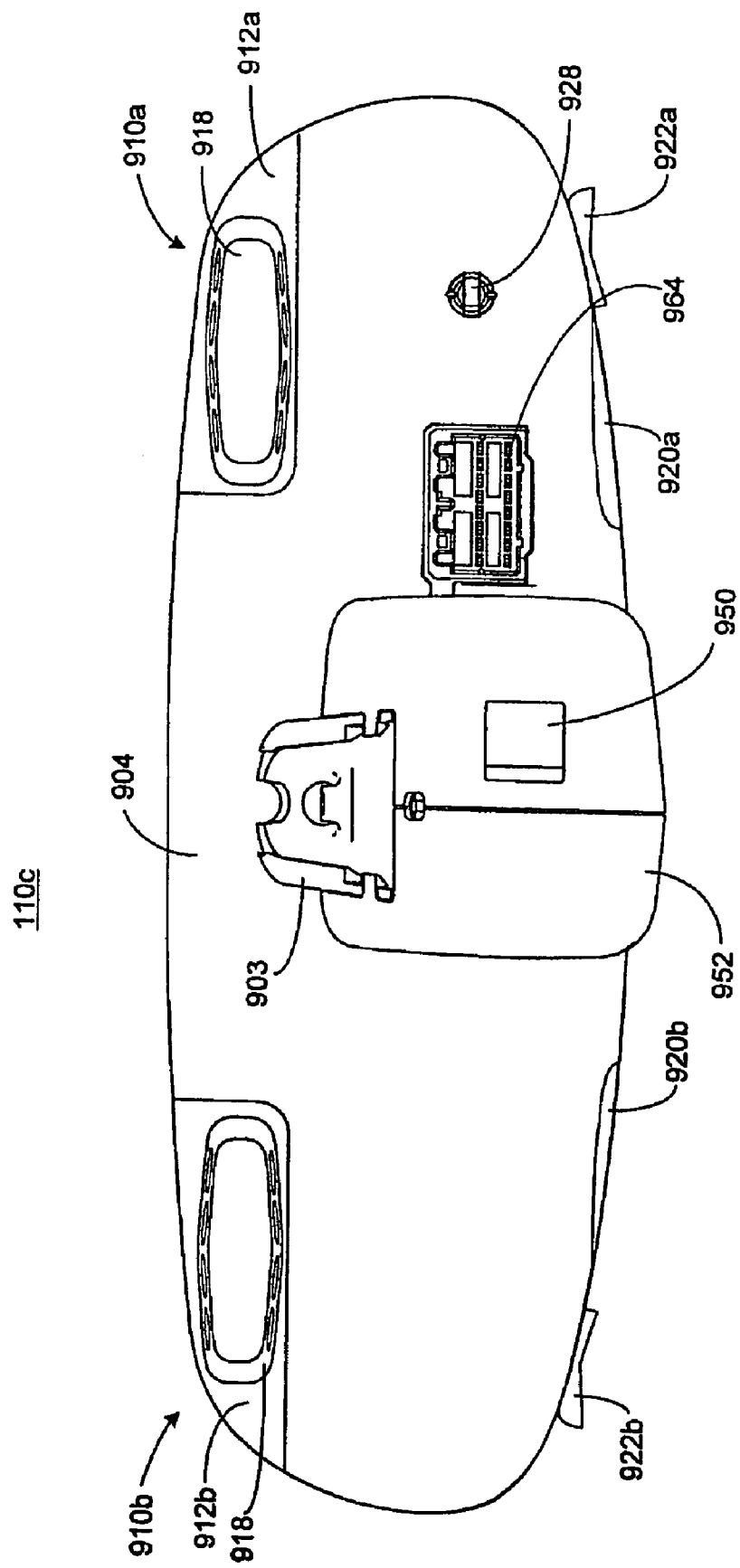
FIG. 13B is an elevational view of the rear of a rearview mirror assembly constructed according to the present invention.
Figure 13C:
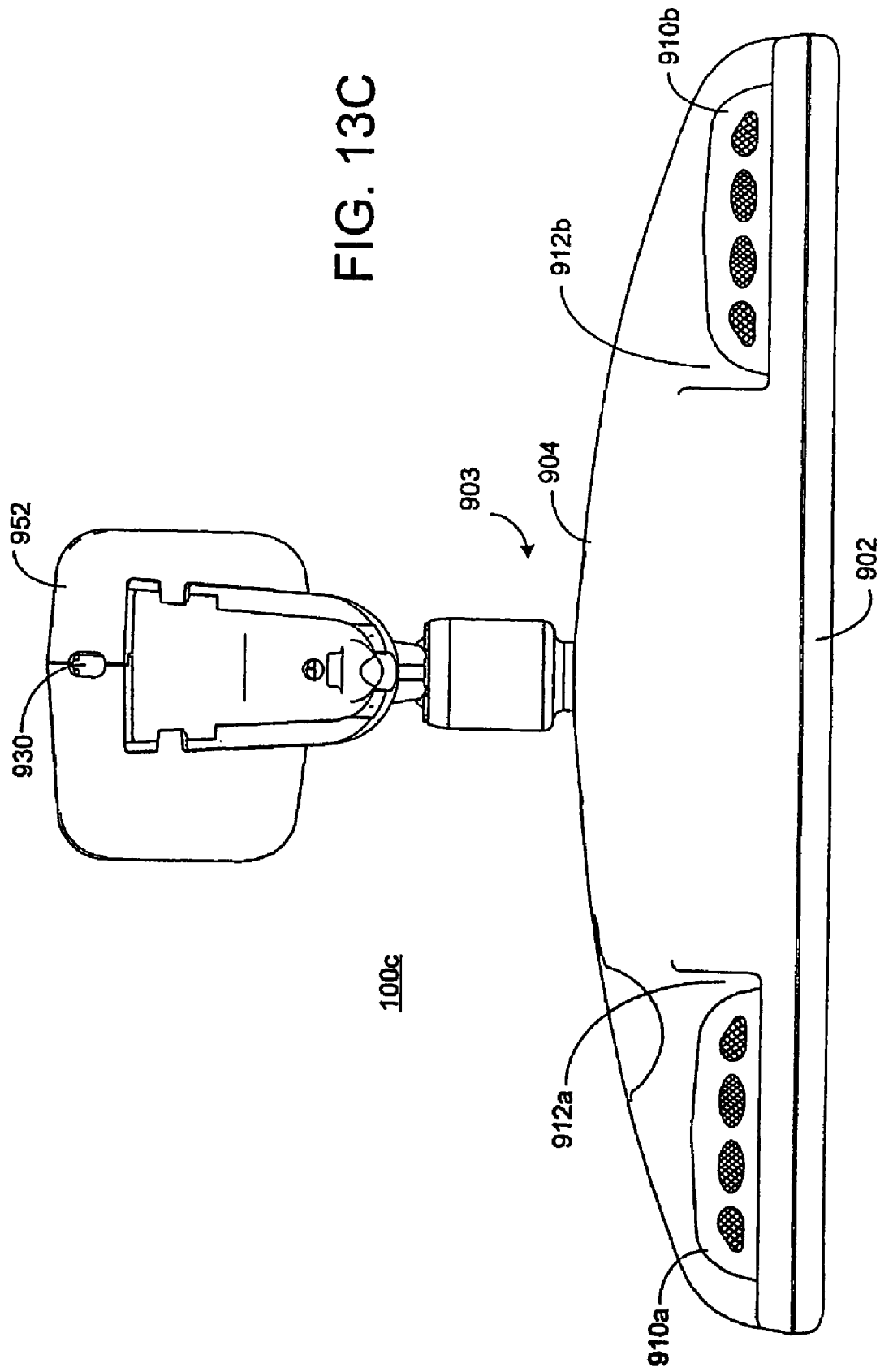
FIG. 13C is a plan view of the top of a rearview mirror assembly constructed according to the present invention.

FIGS. 13A-13C show another embodiment of a rearview mirror assembly 110c in which any of the above described mirror elements 115 is incorporated. As illustrated in FIGS. 13A-13C, mirror assembly 900a comprises a bezel 902 and a case 904. The bezel and the case combine to define the mirror housing for incorporation of features in addition to a reflective element 115 and information displays 905a and 905b. Commonly assigned U.S. Pat. Nos. 6,102,546, D410,607, 6,407,468, 6,420,800, and 6,471,362, the disclosures of which are incorporated in their entireties herein by reference, describe examples of various bezels, cases and associated button construction that may be used with the present invention.

As depicted in FIGS. 13A-13C, mirror assembly 110c may comprise first and second microphones 910a and 910b. Examples of microphones for use with the present invention are described in commonly assigned U.S. patent application Ser. No. 09/444,176, U.S. Pat. Nos. 6,614,911 and 6,882,734, and PCT Application No. PCT/US02/32386, the disclosures of which are incorporated in their entireties herein by reference. Although the two microphones are shown as being mounted to the backside of mirror case 904, one or more such microphones may be mounted on the top of the mirror assembly (as shown in FIGS. 14A and 14B), on the bottom of the mirror assembly, or anywhere within the mirror case or bezel. Preferably, two microphones 910a and 910b are incorporated, one near each end, into the mirror assembly on the backside of the mirror case within recessed portions 912a and 912b. As shown in FIG. 13A, the microphones are constructed with an acoustic dam 914 extending around transducer 916 within microphone housing 918. Additional details of this preferred construction are disclosed in commonly-assigned International PCT Application No. PCT/US02/32386, the entire disclosure of which is incorporated herein by reference. The audio systems including the microphones may be integrated, at least in part, in a common control with information displays and/or may share components with the information displays. In addition, the status of these systems and/or the devices controlled thereby may be displayed on the associated information displays.

As shown in FIGS. 14A and 14B, a single microphone 910 is provided on the top side of the mirror assembly 110d. In this construction, it is preferable to include two transducers in microphone housing 918 in a manner similar to that disclosed in the above-referenced International PCT Application No. PCT/US02/32386 and U.S. Pat. No. 6,882,734.

Mirror assembly 110c, 110d may include first and second illumination assemblies 920a and 920b. Various illumination assemblies and illuminators for use with the present invention are described in commonly assigned U.S. Pat. Nos. 5,803,579, 6,335,548, 6,441,943, 6,521,916, 6,523,976, 6,670,207, and 6,805,474, as well as, commonly assigned U.S. patent application Ser. No. 09/723,675, the disclosures of which are incorporated in their entireties herein by reference. Each illumination assembly preferably comprises a reflector, a lens and an illuminator (not shown). There may be two illumination assemblies generally positioned to illuminate a front passenger seat area and the second generally positioned to illuminate a driver seat area. Alternatively, there may be only one illumination assembly that illuminates both seat areas and/or there may be additional illuminator assemblies such as one to illuminate a center console area, overhead console area or an area between the front seats.

Mirror assembly 110c, 110d may also include first and second switches 922a and 922b. Suitable switches for use with the present invention are described in detail in commonly assigned U.S. Pat. Nos. 6,407,468, 6,420,800, 6,426,568, 6,614,579, and 6,471,362, the disclosures of which are incorporated in their entireties herein by reference. These switches may be incorporated to control the illumination assemblies, the displays, the mirror reflectivity, a voice activated system, a compass system, a telephone system, a highway toll booth interface, a telemetry system, a headlight controller, a rain sensor, a tire pressure monitoring system, a navigation system, a lane departure warning system, an adaptive cruise control system, etc. Any other display or system described herein or within the references incorporated by reference may be incorporated in any location within the associated vehicle and may be controlled using the switches.

Mirror assembly 110c, 110d may also include first and second indicators 924a and 924b. Various indicators for use with the present invention are described in commonly assigned U.S. Pat. Nos. 5,803,579, 6,335,548, 6,441,943, 6,521,916, 6,523,976, 6,670,207, and 6,805,474, as well as, commonly assigned U.S. patent application Ser. No. 09/723,675, the disclosures of which are incorporated in their entireties herein by reference. These indicators may indicate the status of the displays, the mirror reflectivity, a voice activated system, a compass system, a telephone system, a highway toll booth interface, a telemetry system, a headlight controller, a rain sensor, a security system, etc. Any other display or system described herein or within the references incorporated by reference may be incorporated in any location within the associated vehicle and may have a status depicted by the indicators.

Mirror assembly 110c, 110d may further include first and second light sensors 926 and 928 serving as glare and ambient sensors, respectively. Preferred light sensors for use within the present invention are described in detail in commonly assigned U.S. Pat. Nos. 5,923,027, 6,313,457, 6,359,274, 6,379,013, 6,402,328, 6,679,608, and 6,831,268, the entire disclosures of which are incorporated herein by reference. The glare sensor 926 and/or ambient sensor 928 automatically control the reflectivity of a self dimming reflective element as well as the intensity of information displays and/or backlighting. The glare sensor 926 may also be used to sense headlights of trailing vehicles and the ambient sensor is used to detect the ambient lighting conditions that the system is operating within. In another embodiment, a sky sensor 930 may be incorporated positioned to detect light levels generally above and in front of an associated vehicle. The sky sensor 930 may be used to automatically control the reflectivity of a self-dimming element, the exterior lights of a controlled vehicle and/or the intensity of information displays. The mirror assembly may further include sun-load sensors for sensing light levels towards the driver side and passenger side of the vehicle so as to control the climate control system of the vehicle.

Additionally, mirror assembly 110c, 110d may include first, second, third, fourth and fifth operator interfaces 932a-932e located in mirror bezel 902. Each operator interface is shown to comprise a backlit information display "A," "AB," "A1," "C," and "12". It should be understood that these operator interfaces can be incorporated anywhere in the associated vehicle, for example, in the mirror case, accessory module, instrument panel, overhead console, dash board, seats, center console, etc. Suitable switch construction is described in detail in commonly assigned U.S. Pat. Nos. 6,407,468, 6,420,800, 6,426,568, 6,614,579, and 6,471,362, the disclosures of which are incorporated in their entireties herein by reference. These operator interfaces may control the illumination assemblies, the displays, the mirror reflectivity, a voice activated system, a compass system, a telephone system, a highway toll booth interface, a telemetry system, a headlight controller, a rain sensor, a tire pressure monitoring system, a navigation system, a lane departure warning system, an adaptive cruise control system, etc. Any other display or system described herein or within the references incorporated by reference may be incorporated in any location within the associated vehicle and may be controlled using an operator interface or interfaces. For example, a user may program a display or displays to depict predetermined information or may program a display or displays to scroll through a series of information, or may enter set points associated with certain operating equipment with associated sensor inputs to display certain information upon the occurrence of a given event. In one embodiment, for example, a given display may be in a non-illuminated state until the engine temperature is above a threshold, the display then automatically is set to display the engine temperature. Another example is that proximity sensors located on the rear of a vehicle may be connected to a controller and combined with a display in a rearview mirror to indicate to a driver the distance to an object; the display may be configured as a bar that has a length proportional to the given distance.

Further, mirror assembly 110c, 110d may include an electronic compass system within the mount or mirror housing of a rearview mirror assembly. Examples of such electronic compass systems are disclosed in commonly assigned U.S. Pat. No. 6,140,933 and commonly assigned U.S. Patent Application Publication Nos. US 2003/0167121 A1, US 2004/0236510 A1, and US 2004/0254727 A1, the entire disclosures of which are incorporated herein by reference.

Although specific locations and numbers of these additional features are depicted in FIGS. 15A-15C and 16A and 16B, it should be understood that fewer or more individual devices may be incorporated in any location within the associated vehicle and as described within the references incorporated herein.

A mirror mount 903 is included for mounting the mirror assembly within a vehicle either to windshield 898, or to the vehicle roof structure. It should be understood that a host of accessories may be incorporated into the mount 903 or into a housing 952 attached to mount 903 such as a rain sensor, a camera, a headlight control, an additional microprocessor, additional information displays, compass sensors, etc. These systems may be integrated, at least in part, in a common control with information displays and/or may share components with the information displays. In addition, the status of these systems and/or the devices controlled thereby may be displayed on the associated information displays.

Mirror assembly 110c is shown in FIG. 15A to further comprise a circuit board 960 on which the compass sensor module (not shown) may be mounted, and a daughter board 962 with an input/output bus interface (not shown).

The electrical output signal from either, or both, of the sensors 926 and 928 may be used as inputs to a controller (not shown) to control the reflectivity of reflective element 901 and, or, the intensity of any one or all of the displays 905a and 905b. The details of various control circuits for use herewith are described in commonly assigned U.S. Pat. Nos. 5,883,605, 5,956,012, 6,084,700, 6,222,177, 6,224,716, 6,247,819, 6,249,369, 6,392,783 and 6,402,328, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Although the compass sensor module may be mounted to circuit board 960, it should be understood that the sensor module may be located within mount 903, an accessory module 952 positioned proximate mirror assembly 110c or at any location within an associated vehicle such as under a dash board, in an overhead console, a center console, a trunk, an engine compartment, etc. The above described compass systems may be integrated, at least in part, in a common control with information displays and/or may share components with the information displays. In addition, the status of these systems and/or the devices controlled thereby may be displayed on the associated information displays.

Circuit board 960 may comprise a controller (not shown), such as a microprocessor, and daughter board 962 may comprise an information display 905a. The microprocessor may, for example, receive signal(s) from the compass sensor module and process the signal(s) and transmit signal(s) to the daughter board to control display 905a to indicate the corresponding vehicle heading. As described herein and within the references incorporated by reference herein, the controller may receive signal(s) from light sensor(s), rain sensor(s) (not shown), automatic vehicle exterior light controller(s) (not shown), microphone(s), global positioning systems (not shown), telecommunication systems (not shown), operator interface(s) and a host of other devices, and control the information display(s) to provide appropriate visual indications.

The controller (or controllers) used to control the rear vision system and or the reflectivity of the mirror element, at least in part, control the mirror reflectivity, exterior lights, rain sensor, compass, information displays, windshield wipers, heater, defroster, defogger, air conditioning, telephone system, navigation system, security system, tire pressure monitoring system, a garage door opening transmitter, remote keyless entry, telemetry systems, voice recognition systems such as digital signal processor based voice actuation systems, and vehicle speed. The controller 430 (or controllers) may receive signals from switches and or sensors associated with any of the devices described herein and in the references incorporated by reference herein to automatically manipulate any other device described herein or described in the references included by reference. The controller may be, at least in part, located outside the mirror assembly or may comprise a second controller elsewhere in the vehicle or additional controllers throughout the vehicle. The individual processors may be configured to communicate serially, in parallel, via BLUETOOTH™ protocol, wireless communication, over the vehicle bus, over a CAN bus or any other suitable communication. A multi-pin connector interface 964 may be provided for such external connections.

Exterior light control systems as described in commonly assigned U.S. Pat. Nos. 5,990,469, 6,008,486, 6,130,421, 6,130,448, 6,255,639, 6,049,171, 5,837,994, 6,403,942, 6,281,632, 6,291,812, 6,469,739, 6,465,963, 6,429,594, 6,587,573, 6,611,610, 6,621,616, 6,653,614, 6,379,013, 6,861,809, and 6,774,988, and U.S. Provisional Patent Application Nos. 60/404,879 and 60/394,583, the disclosures of which are incorporated in their entireties herein by reference, may be incorporated in accordance with the present invention. These systems may be integrated, at least in part, in a common control with information displays and/or may share components with the information displays. In addition, the status of these systems and/or the devices controlled thereby may be displayed on the associated information displays. As disclosed in U.S. Pat. No. 6,587,573, both the compass sensors and the imaging sensor array 950, may be housed in an accessory housing 952 attached to mount 903.

Moisture sensors and windshield fog detector systems are described in commonly-assigned U.S. Pat. Nos. 5,923,027, 6,617,564, 6,681,163, and 6,313,457, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Commonly assigned U.S. Pat. No. 6,262,831, the disclosure of which is incorporated herein by reference in its entirety, describes power supplies for use with the present invention. These systems may be integrated, at least in part, in a common control with information displays and/or may share components with the information displays. In addition, the status of these systems and/or the devices controlled thereby may be displayed on the associated information displays.

The mirror assembly may further include one or more antennae 940 for receipt and/or transmission of RF signals. Appropriate receiving, transmitting, and/or processing circuitry may further be included in or attached to the mirror assembly. Such antennae may be used for a cellular telephone system, a BLUETOOTH™ transmitting/receiving system, a remote keyless entry (RKE) system, a trainable garage door opener system, a tire pressure monitoring system, a global positioning satellite system, a LORAN system, etc. Some of these systems may share a common antenna and receiving, transmitting, processing, and display circuits where appropriate. Examples of a tire pressure monitoring system incorporated in a rearview mirror assembly are disclosed in commonly assigned U.S. Pat. Nos. 6,215,389, 6,431,712, 6,861,942, and 6,696,935, the entire disclosures of which are incorporated herein by reference. Examples of a GPS system incorporated in a rearview mirror assembly are disclosed in commonly assigned U.S. Pat. Nos. 6,166,698, 6,297,781, 6,396,446, and in U.S. Patent Published Application No. US 2002/0032510 A1, the entire disclosures of which are incorporated herein by reference. An example of a LORAN system incorporated in a rearview mirror assembly is disclosed in commonly assigned U.S. Pat. No. 6,539,306, the entire disclosure of which is incorporated herein by reference. An example of both telephone/telematics system and a BLUETOOTH™ system incorporated in a rearview mirror assembly is disclosed in commonly assigned U.S. Patent Application No. US 2002/0032510 A1, the entire disclosure of which is incorporated herein by reference. Examples of a trainable garage door opening systems and RKE systems incorporated in a rearview mirror assembly are disclosed in U.S. Pat. No. 6,091,343, the entire disclosures of which are incorporated herein by reference.

The mirror may further include an infrared (IR) transmitter/receiver for transmitting/receiving information to and from the mirror assembly and possibly to and from the vehicle. An example of such a rearview mirror assembly is disclosed in commonly-assigned U.S. Pat. No. 6,407,712, the entire disclosure of which is incorporated herein by reference.

The mirror assembly may further include one or more of the same or different types of displays. Examples of different types of displays include vacuum fluorescent, LCD, reverse LCD, LED, organic LED, dot matrix, backlit indicia, etc. For displays intended to simultaneously display significant amounts of information, the display disclosed in commonly-assigned U.S. Pat. No. 6,346,698 may be used. The entire disclosure of which is incorporated herein by reference. Examples of backlit indicia panel displays are disclosed in commonly-assigned U.S. Pat. Nos. 6,170,956, 6,572,233, 6,870,655, and 6,356,376, the entire disclosures of which are incorporated herein by reference. Various displays used in rearview mirrors are disclosed in commonly-assigned U.S. Pat. Nos. 6,356,376 and 6,700,692, the entire disclosures of which are incorporated herein by reference.

The wiring for the vehicle accessories in the rearview mirror assembly housing may be run through the mounting bracket and along the windshield (if the mounting bracket does not already extend to the headliner) under a channel mount. An example of a rearview mirror assembly in which the wiring for accessories in the mirror assembly housing are routed through the mounting bracket is disclosed in commonly-assigned U.S. Pat. No. 6,467,919, the entire disclosure of which is incorporated herein by reference.

While the present invention has been described as being implemented with the sensors positioned within the housing of a rearview mirror assembly, the sensors could be mounted in the mounting foot or in any other location of the rearview mirror assembly. Further still, any or all of the various components of the inventive electronic compass may be mounted elsewhere in the vehicle. It will be further appreciated that certain embodiments of the present invention are novel and useful in vehicles such as land-based vehicles (i.e., automobiles, trucks, sport utility vehicles (SUVs), trains, motorcycles, bicycles, mopeds, scooters, snowmobiles, all-terrain vehicles (ATVs), military vehicles) as well as in other vehicles such as airplanes, marine vessels, and amphibious vehicles.

The switchable variable pitch cholesteric reflective polarizers described above can also be used in windows, sunroofs and skylights where their switchable reflective properties have advantages over electrochromic devices in similar applications. Electrochromic window, sunroof or skylight devices attenuate light by absorbing it. As a direct result of absorbing this light or energy the temperature of the electrochromic device increases. The temperature rise can be substantial (+50° C. above ambient temperatures). The electrochromic window, sunroof or skylight will dissipate this heat by radiation and/or conduction and if this heat is transferred into the structure or vehicle incorporating the electrochromic device it will tend to reduce the energy efficiency and creature comfort these devices are intended to provide. Higher electrochromic device operating temperatures can also shorten usable device life.

A window, sunroof or skylight constructed from one or two switchable variable pitch reflective polarizer(s) would reflect and not absorb light and therefore would not get as hot as an electrochromic device in a similar application. The mode of operation of one switchable variable pitch cholesteric reflective polarizer would be either to reflect one type of polarization and transmit the other or transmit both types of polarization. Two switchable variable pitch cholesteric polarizers could be configured to reflect both types of polarization, reflect one type of polarization and transmit the other or transmit both types of polarization.

The wavelength range of radiation that is reflected or transmitted can be tuned by adjusting pitch of the cholesteric structure. Low E coatings on glass typically used in the window industry reflect wavelengths of light greater than 2400 nm and have high transmission in the visible range. In window, sunroof and skylight applications it is desirable to switchably attenuate the remaining visible (400 nm to 800 nm) and near infrared (IR) light (800 nm to 2400 nm). It is also desirable to switchably attenuate visible light and IR light separately. This can be achieved with one or more switchable variable pitch cholesteric reflective polarizers by adjusting the mean pitch length and reflective band width of the variable pitch cholesteric media. One could configure a single variable pitch cholesteric reflective polarizer with a wide bandwidth to reflect visible and IR light or stack two or more variable pitch cholesteric reflective polarizers with different mean pitch lengths to selectively reflect in the visible or IR or both.

It is sometimes desirable in architectural or vehicle applications to have windows, sunroofs or skylights that are colored. This can also be achieved with variable pitch cholesteric reflective polarizers by again adjusting the mean pitch and range of pitch in the cholesteric media to selectively reflect and transmit different wavelengths or colors of light. As the voltage applied across the cholesteric media is increased the cholesteric pitch structure begins to unwind (pitch increases) as more liquid crystal molecules begin to align with the applied field. This voltage induced pitch change can change the reflected bandwidth and shift the mean wavelength of light that is reflected resulting in a color change and/or a shift in reflection from the visible to the IR.

In window, sunroof and skylight applications it is often not desirable to have specular reflection of light in the high reflectance mode. Switchable variable pitch cholesteric media can be made to diffusely reflect light if the direction of pitch varies. This can be accomplished for instance by roughening one or both substrate surface(s) or adding particles such as glass or plastic spheres, flakes or other shapes of preferably transparent solid media to the variable pitch cholesteric layer.

To align the liquid crystal molecules in a preferred direction the device substrate(s) and/or cholesteric media spheres of particulate filler(s) can be surface treated with materials such as amino silane or octadecyl silane to promote either homogeneous (parallel) or homeotropic (perpendicular) alignment or both to generate a diffuse scattering reflective texture. The substrates may be treated with a polymer such as a polyimide, polyvinyl alcohol or polyamideimide with an unidirectional orientation (achieved by rubbing or other means) to align the liquid crystal molecules in a preferred direction with a preferred tilt angle relative to the substrate surface. Preferably such a device would be low in haze in the high transmission state and diffusely reflective in the high reflection state.

The switchable variable pitch cholesteric reflective polarizers described in U.S. Pat. Nos. 5,762,823 and 5,798,057 have another major advantage when used in window applications relative to the typical liquid crystal device and liquid containing electrochromic elements in that the cholesteric media is a non-flowing solid or free standing gel. Windows are generally mounted in a vertical orientation and if the cholesteric media were in a liquid or flowing gel form the device would tend to develop thick spots near the bottom due to hydrostatic pressure. This problem may be overcome using the teachings disclosed in commonly assigned U.S. Pat. No. 5,940,201 entitled "ELECTROCHROMIC MIRROR WITH TWO THIN GLASS ELEMENTS AND A GELLED ELECTROCHROMIC MEDIUM," filed on Apr. 2, 1997. The entire disclosure of this patent is incorporated herein by reference.

Figure 15:
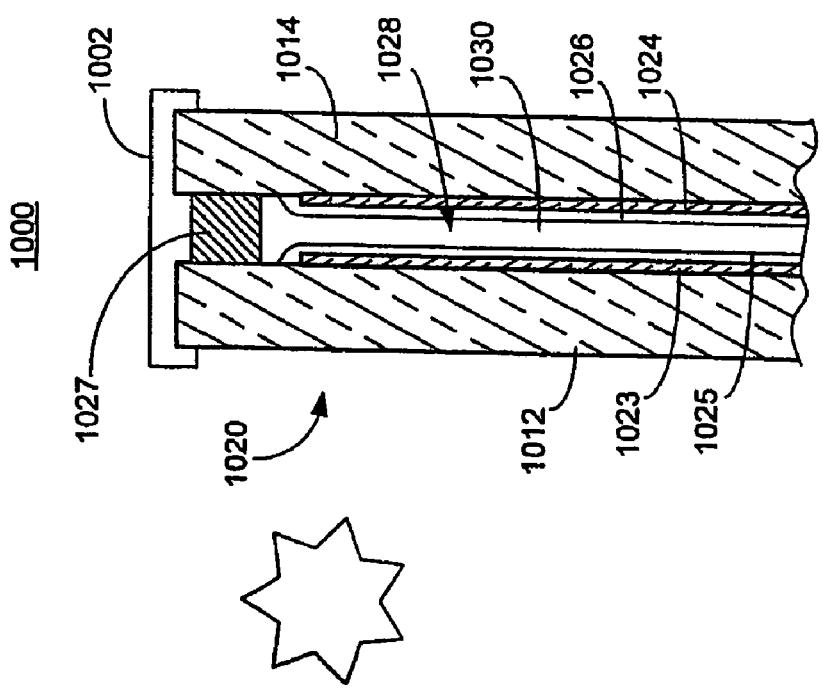
FIG. 15 is a cross-sectional view of a window constructed in accordance with the present invention.

FIG. 15 shows a first embodiment of a window 1000 constructed in accordance with the present invention. Window 1000 comprises a frame 1002, a first transparent substrate 1012, and a second transparent substrate 1014, which serve as the substrates for a cholesteric element 1020. Cholesteric element 1020 has first and second transparent electrodes 1023 and 1024 provided on respective substrates 1012 and 1014. In addition, cholesteric element 1020 includes orientation layers 1025 and 1026 provided on respective transparent electrodes 1023 and 1024 and a seal 1027. A mixture 1030 of polymerizable, cholesteric liquid crystalline molecules are provided within chamber 1028. Further details of the construction of a suitable cholesteric element is disclosed in U.S. Pat. Nos. 5,762,823 and 5,798,057, the entire disclosures of which are incorporated herein by reference.

Figure 16:
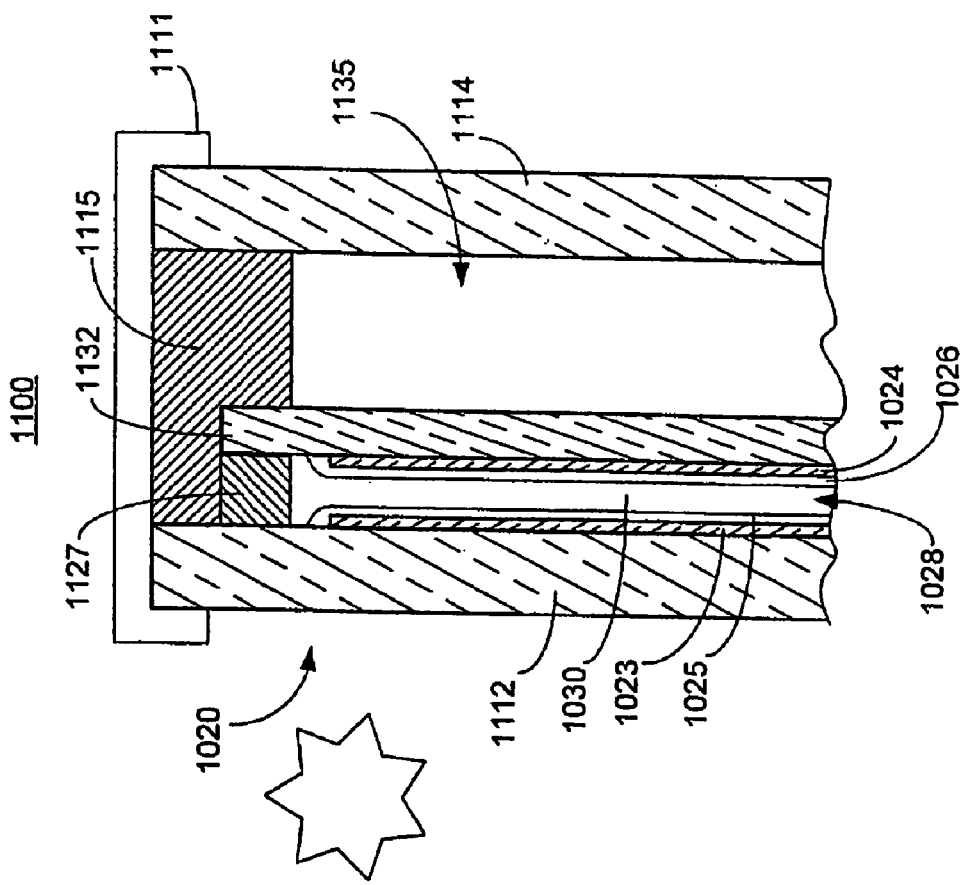
FIG. 16 is a cross-sectional view of an insulated window constructed in accordance with one embodiment of the present invention.

FIG. 16 shows a first embodiment of an insulated window 1100 constructed in accordance with the present invention. Insulated window 1100 includes a frame 1111, two outer panes 1112 and 1114 with a cholesteric element 1020 provided therebetween. Preferably, the pane 1112 facing the outside environment serves as a substrate for cholesteric element 1020. The other substrate 1132 is spaced from pane 1114 to provide a sealed chamber 1135 therebetween. Chamber 1135 may be filled with in insulating gas such as argon or the like. The window 1100 further includes an outer seal 1115 that seals chamber 1135 and that acts as a spacer.

Figure 17:
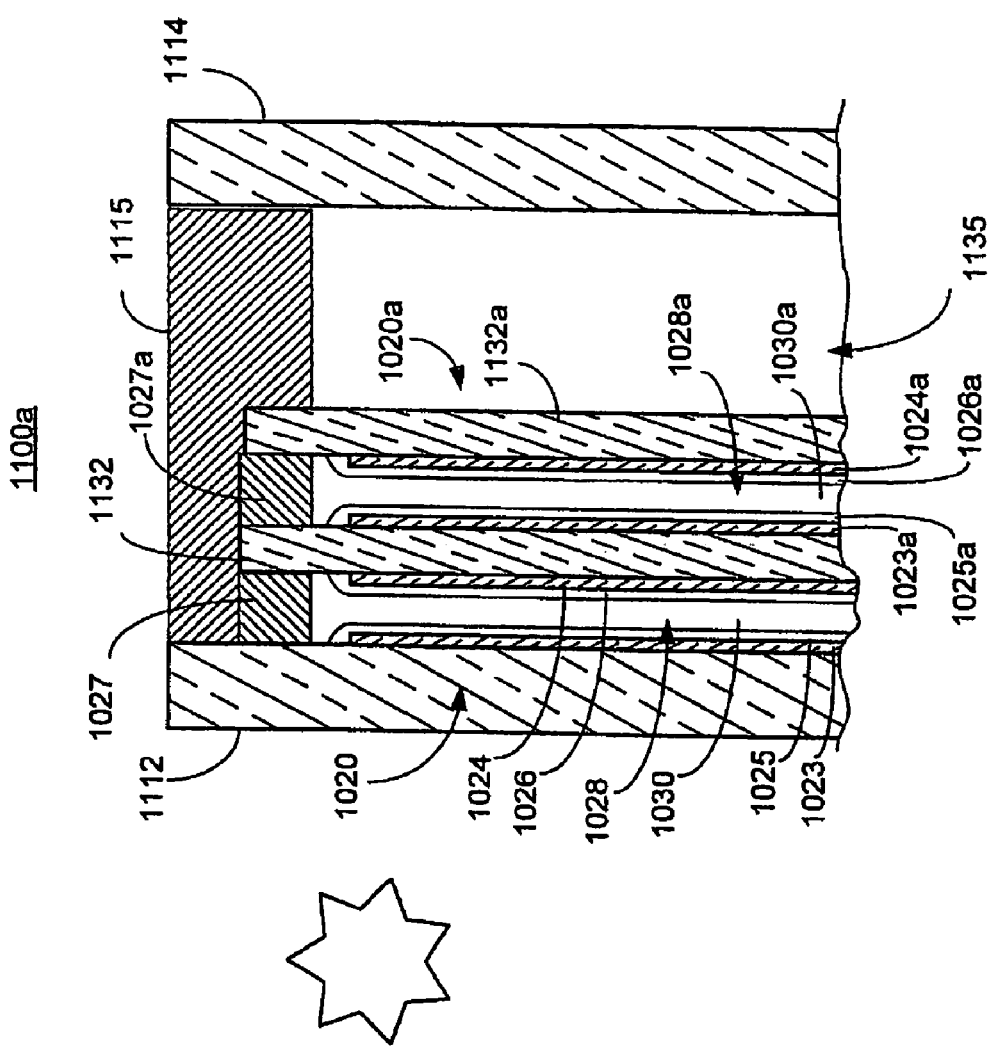
FIG. 17 is a cross-sectional view of an insulated window constructed in accordance with another embodiment of the present invention.

FIG. 17 shows a second embodiment of an insulated window 1100a constructed in accordance with the present invention. Insulated window 1100a is similar to insulated window 1100 except that a second cholesteric element 1020a is provided between panes 1112 and 1114. This provides the benefits discussed above. In this embodiment, the first and second cholesteric elements are adjacent one another and share substrate 1132.

Figure 18:
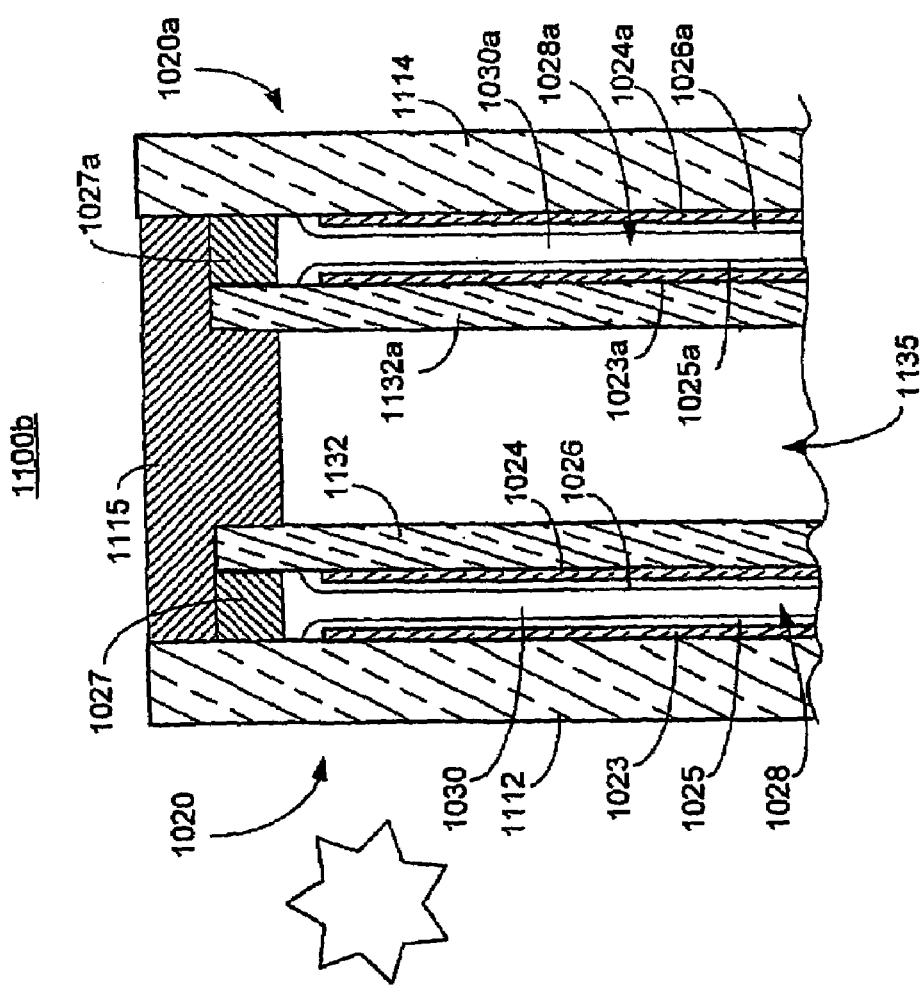
FIG. 18 is a cross-sectional view of an insulated window constructed in accordance with another embodiment of the present invention.

FIG. 18 shows a third embodiment of an insulated window 1100b constructed in accordance with the present invention. Insulated window 1100b is similar to insulated window 1100a except that the second cholesteric element 1020a is provided adjacent pane 1114 such that pane 1114 acts as one of the substrates for element 1020a. The insulated chamber 1035 is thus provided between cholesteric elements 1020 and 1020a. It will be appreciated that for some applications, it may be beneficial to replace the second cholesteric element 1020a with an electrochromic element to provide heat absorption and radiation during winter months.

Figure 19:
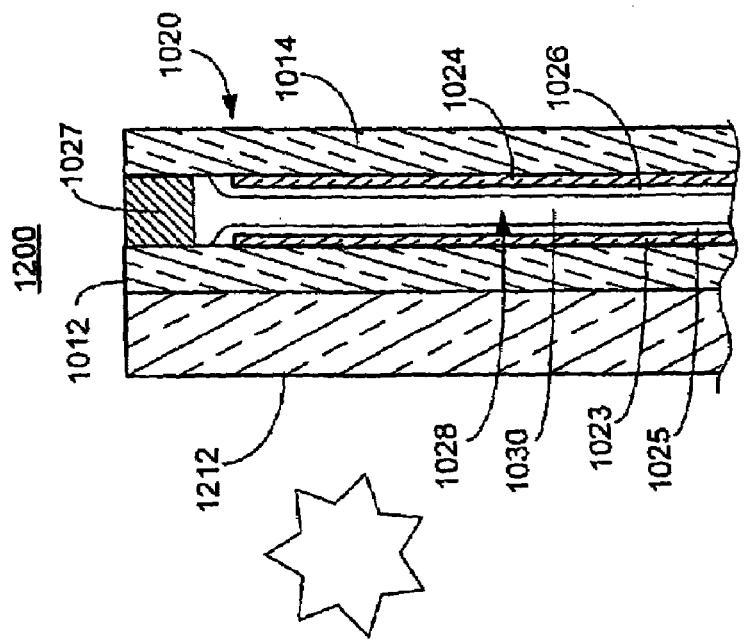
FIG. 19 is a cross-sectional view of a vehicle window constructed in accordance with the present invention.

FIG. 19 shows a vehicle window/sunroof 1200 comprising a cholesteric element 1020 and a shatterproof transparent substrate 1212, which may be made of polyvinylbutrate (PVB), or the like. Cholesteric element 1020 may be provided on either the inside or outside of substrate 1212.

U.S. Pat. Nos. 6,239,898, 6,594,065, 6,407,847, 6,594,067, 6,671,080, 6,842,276, 6,567,708, 6,597,489, 6,045,643, and 5,805,330 disclose various other aspects relating to electro-optic windows that may be incorporated in any of the window embodiments described herein. The entire disclosures of which are incorporated herein by reference.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A variable reflectance mirror element for use in a rearview mirror assembly having an electronic device positioned behind the mirror element for transmitting or receiving light of a first polarization, the mirror element comprising:

a first substrate having first and second surfaces;

a second substrate having third and fourth surfaces, the second and first substrates positioned in a spaced-apart relationship such that the second and third surfaces face each other;

a first electrode carried on a surface of the first substrate;

a second electrode carried on a surface of the second substrate, an electrochromic medium provided between the first and second substrates; and a reflective polarizer for substantially transmitting light of a first polarization and substantially reflecting light of a second polarization, the second polarization being opposite the first polarization, the reflective polarizer disposed on or near the second substrate such that the electronic device transmits or receives light of the first polarization through the reflective polarizer, wherein the reflective polarizer includes multiple layers of plastic film.

2. A variable reflectance mirror element according to claim 1, wherein the reflective polarizer is laminated to the second substrate proximate the third surface.

3. A variable reflectance mirror element according to claim 1, wherein the reflective polarizer is laminated to the second substrate proximate the fourth surface.

4. A variable reflectance mirror element according to claim 1, wherein the reflective polarizer is laminated to the electronic device.

5. A variable reflectance mirror element according to claim 1, wherein the electronic device is a liquid crystal display.

6. A variable reflectance mirror element according to claim 1, further comprising a switchable cholesteric element including a cholesteric medium, the switchable cholesteric element disposed between the electro-optical medium and the electronic device.

7. A variable reflectance mirror element according to claim 6, wherein the mirror element is characterized by a reflectivity that can be set to any specified value within a range.

8. A variable reflectance mirror element according to claim 6, wherein the mirror element is characterized by at least three discrete states of reflectivity.

9. A variable reflectance mirror element according to claim 1, wherein the cholesteric medium is characterized by a variable pitch.

10. A variable reflectance mirror element according to claim 1, the mirror element configured within a rearview mirror assembly further comprising at least one device selected from the group consisting of an interior illumination assembly, an exterior light control, a moisture sensor, an information display, a light sensor, a blind spot indicator, a turning signal indicator, an approach warning, an operator interface, a compass, a temperature indicator, a voice actuated device, a microphone, a dimming circuitry, a GPS device, a telecommunication system, a navigation aid, a lane departure warning system, an adaptive cruise control, a vision system, a rear vision system and a tunnel detection system.

11. A variable reflectance mirror element according to claim 10, wherein an overall reflection, by the mirror element, of light incident on the first surface is at least sixty percent.

12. A variable reflectance element according to claim 1, wherein the mirror element is characterized by a transmittance that is a function of voltage applied between the first and second electrodes.

13. A variable reflectance mirror element for use in a rearview mirror assembly having an electronic device positioned behind the mirror element for transmitting or receiving light of a first polarization, the mirror element comprising:
  a first substrate having first and second surfaces;
  a second substrate having third and fourth surfaces, the second and first substrates positioned in a spaced-apart relationship such that the second and third surfaces face each other;
  a first electrode carried on a the first substrate;
  a second electrode carried on the second substrate,
  an electrochromic medium provided between the first and second substrates; and
  a reflective polarizer for substantially transmitting light of a first polarization and substantially reflecting light of a second polarization, the second polarization being opposite the first polarization, the reflective polarizer disposed on or near the second substrate such that the electronic device transmits or receives light of the first polarization through the reflective polarizer, the reflective polarizer laminated to the second substrate.

14. A variable reflectance mirror element according to claim 13, wherein the reflective polarizer is laminated to the third surface.

15. A variable reflectance mirror element according to claim 13, wherein the reflective polarizer is laminated to the fourth surface.

16. A variable reflectance mirror element according to claim 13, wherein the reflective polarizer comprises multiple layers of plastic film.

17. A variable reflectance mirror element according to claim 13, wherein the reflective polarizer includes a wire-gild polarizer.

18. A variable reflectance mirror element according to claim 13, wherein the electronic device is a liquid crystal display.

19. A variable reflectance mirror element according to claim 18, wherein the liquid crystal display is a video display.

20. A variable reflectance mirror element according to claim 18, wherein an area of the liquid crystal display is substantially equal to a viewing area of the variable reflectance mirror element.

21. A variable reflectance mirror element according to claim 18, wherein the liquid crystal display is characterized by a width between 6 and 14 inches and a width-to-height ratio between 2:1 and 12:1.

22. A variable reflectance mirror element according to claim 21, wherein the width-to-height ratio of the liquid crystal display is between 3:1 and 6:1.

23. A variable reflectance mirror element according to claim 21, wherein the width-to-height ratio of the liquid crystal display is between 4:1 and 5:1.

24. A variable reflectance mirror element according to claim 18, wherein the liquid crystal display is backlit with light-emitting diodes.

25. A variable reflectance mirror element according to claim 13, further comprising at least one optical thin film disposed next to the reflective polarizer so as to enhance a reflectivity of the reflective polarizer.

26. A variable reflectance mirror element according to claim 25, wherein the at least one optical thin film includes a dichroic thin-film stack.

27. A variable reflectance mirror element according to claim 13, wherein the reflective polarizer comprises a switchable cholesteric element including a cholesteric medium, the switchable cholesteric element disposed between the electro-optical medium and the electronic device.

28. A variable reflectance mirror element according to claim 27, wherein the cholesteric medium is characterized by a variable pitch.

29. A variable reflectance mirror element according to claim 27, wherein the mirror element is characterized by a reflectivity that can be set to any specified value within a range.

30. A variable reflectance mirror element according to claim 27, wherein the mirror element is characterized by at least three discrete states of reflectivity.

31. A variable reflectance mirror element according to claim 27, wherein an overall reflection, by the mirror element, of light incident on the first surface is at least sixty percent.

32. A variable reflectance mirror element according to claim 13, the mirror element configured within a rearview mirror assembly further comprising at least one device selected from the group consisting of an interior illumination assembly, an exterior light control, a moisture sensor, an information display, a light sensor, a blind spot indicator, a turning signal indicator, an approach warning, an operator interface, a compass, a temperature indicator, a voice actuated device, a microphone, a dimming circuitry, a GPS device, a telecommunication system, a navigation aid, a lane departure warning system, an adaptive cruise control, a vision system, a rear vision system and a tunnel detection system.

33. A variable reflectance mirror element according to claim 13, wherein the reflective polarizer functions as the second electrode.

34. A variable reflectance element according to claim 13, wherein the mirror element is characterized by a transmittance that is a function of voltage applied between the first and second electrodes.

35. A variable reflectance mirror element for use in a rearview mirror assembly having an electronic device positioned behind the mirror element for transmitting or receiving light of a first polarization, the mirror element comprising:
   a first substrate having first and second surfaces;
   a second substrate having third and fourth surfaces, the second and first substrates positioned in a spaced-apart relationship such that the second and third surfaces face each other;
   a first electrode carried on a surface of the first substrate;
   a second electrode carried on a surface of the second substrate;
   an electrochromic medium provided between the first and second substrates;
   a reflective polarizer for substantially transmitting light of a first polarization and substantially reflecting light of a second polarization, the second polarization being opposite the first polarization, the reflecting polarizer positioned on or near the second substrate such that the electronic device transmits or receives light of the first polarization through the reflective polarizer; and
   at least one optical film enhancing a reflectivity of the reflective polarizer.

36. A variable reflectance mirror element according to claim 35, wherein the mirror element is characterized by a reflectance of at least fifty percent.

37. A variable reflectance mirror element according to claim 36, the mirror element configured within a rearview mirror assembly further comprising at least one device selected from the group consisting of an interior illumination assembly, an exterior light control, a moisture sensor, an information display, a light sensor, a blind spot indicator, a turning signal indicator, an approach warning, an operator interface, a compass, a temperature indicator, a voice actuated device, a microphone, a dimming circuitry, a GPS device, a telecommunication system, a navigation aid, a lane departure warning system, an adaptive cruise control, a vision system, a rear vision system and a tunnel detection system.

38. A variable reflectance mirror element according to claim 35, wherein the mirror element is characterized by a reflectance of at least sixty percent.

39. A variable reflectance mirror element according to claim 35, wherein the reflective polarizer includes multiple layers of plastic film.

40. A variable reflectance mirror element according to claim 35, wherein the reflective polarizer includes a wire-grid polarizer.

41. A variable reflectance mirror element according to claim 35, wherein the reflective polarizer is laminated to the fourth surface.

42. A variable reflectance mirror element according to claim 35, wherein the reflective polarizer is laminated to the third surface.

43. A variable reflectance mirror element according to claim 35, wherein the electronic device is a liquid crystal display.

44. A variable reflectance mirror element according to claim 43, wherein the liquid crystal display is a video display.

45. A variable reflectance mirror element according to claim 43, wherein an area of the liquid crystal display is substantially equal to a viewing area of the variable reflectance mirror element.

46. A variable reflectance mirror element according to claim 43, wherein the liquid crystal display is characterized by a width between 6 and 14 inches and a width-to-height ratio of the liquid crystal display is between 2:1 and 12:1.

47. A variable reflectance mirror element according to claim 46, wherein the width-to-height ratio of the liquid crystal display is between 3:1 and 6:1.

48. A variable reflectance mirror element according to claim 46, wherein the width-to-height ratio of the liquid crystal display is between 4:1 and 5:1.

49. A variable reflectance mirror element according to claim 43, wherein the liquid crystal display is backlit with light-emitting diodes.

50. A variable reflectance mirror element according to claim 35, wherein the at least one optical thin film includes a dichroic thin-film stack.

51. A variable reflectance mirror element according to claim 35, wherein the reflective polarizer functions as the second electrode.

52. A variable reflectance mirror element according to claim 35, wherein the reflective polarizer comprises a switchable cholesteric element including a cholesteric medium, the switchable cholesteric element disposed between the electro-optical medium and the electronic device.

53. A variable reflectance mirror element according to claim 52, wherein the cholesteric medium is characterized by a variable pitch.

54. A variable reflectance mirror element according to claim 52, wherein the mirror element is characterized by a reflectivity that can be set to any specified value within a range.

55. A variable reflectance mirror element according to claim 52, wherein the mirror element is characterized by at least three discrete states of reflectivity.

56. A variable reflectance element according to claim 35, wherein the mirror element is characterized by a transmittance that is a function of voltage applied between the first and second electrodes.

* * * * *

UNITED STATES PATENT AND TRADEMARK OFFICE
CERTIFICATE OF CORRECTION

PATENT NO. : 7,679,809 B2 Page 1 of 1
APPLICATION NO. : 12/191804
DATED : March 16, 2010
INVENTOR(S) : Tonar et al.

It is certified that error appears in the above-identified patent and that said Letters Patent is hereby corrected as shown below:

Column 30, line 11, "wire-gild" should be --wire-grid--.

Signed and Sealed this

First Day of June, 2010

David J. Kappos
*Director of the United States Patent and Trademark Office*